(12) United States Patent
Kohso et al.

(10) Patent No.: US 7,038,877 B2
(45) Date of Patent: May 2, 2006

(54) HEAD POSITIONING APPARATUS

(75) Inventors: Hiroshi Kohso, Minamikawachi-gun (JP); Toshio Inaji, Mino (JP); Keizo Miyata, Yawata (JP)

(73) Assignee: Matsushita Electric Idustrial Co., Ltd., Osaka (JP)

( * ) Notice: Subject to any disclaimer, the term of this patent is extended or adjusted under 35 U.S.C. 154(b) by 0 days.

(21) Appl. No.: 10/800,193

(22) Filed: Mar. 11, 2004

(65) Prior Publication Data

US 2004/0179290 A1    Sep. 16, 2004

(30) Foreign Application Priority Data

Mar. 12, 2003    (JP)    ............................. 2003-067154

(51) Int. Cl.
*G11B 5/596*    (2006.01)

(52) U.S. Cl. .................................. 360/78.05; 360/78.04
(58) Field of Classification Search ............. 360/78.05, 360/75, 77.01, 77.02, 77.03, 77.06, 78.01, 360/78.04, 78.09, 78.11
See application file for complete search history.

(56) References Cited

U.S. PATENT DOCUMENTS

| 6,747,836 | B1 * | 6/2004 | Stevens et al. ........... 360/78.05 |
| 2002/0054451 | A1 * | 5/2002 | Moon et al. ............. 360/78.06 |
| 2003/0117742 | A1 * | 6/2003 | Koso et al. .............. 360/78.05 |

FOREIGN PATENT DOCUMENTS

| JP | 4-368676 | 12/1992 |
| JP | 11-219572 | 8/1999 |
| JP | 2003-157632 | 5/2003 |

* cited by examiner

*Primary Examiner*—David Hudspeth
*Assistant Examiner*—Jason Olson
(74) *Attorney, Agent, or Firm*—Hamre, Schumann, Mueller & Larson, P.C.

(57) ABSTRACT

A head positioning apparatus capable of positioning a head at high speed and with high accuracy is provided. The head positioning apparatus includes a magnetic head, a head supporting mechanism, a coarse actuator, a fine actuator, a head position detection part, a fine movement control system for controlling the fine actuator based on the head position detected by the head position detection part, a head moving distance estimation part estimating the head moving distance representing the distance the magnetic head moves, and the coarse movement control system for controlling the coarse actuator based on the head moving distance estimated by the head moving distance estimation part.

30 Claims, 24 Drawing Sheets

HEAD POSITIONING APPARATUS

BACKGROUND OF THE INVENTION

1. Field of the Invention

The present invention relates to a head positioning apparatus for positioning a head on a disk-shaped recording medium with respect to which information is recorded or reproduced.

2. Description of the Related Art

In recent years, with the development of multimedia, in the market, there is a strong demand for a high-recording density disk apparatus capable of positioning a head at a targeted position at high speed and recording/reproducing a large capacity of video information, audio information and character information, and the like, at high speed. Since in particular, there has been an increasing demand for using a magnetic disk apparatus for mobile terminal apparatus, etc., it is necessary to further miniaturize the magnetic disk apparatus. As the disk apparatus is becoming smaller in size and higher in density, there has been an ever stronger demand for more accurate positioning of the head.

In particular, in accordance with the miniaturization of the disk apparatus, friction in a bearing portion, provided in a positioning mechanism for positioning a head, effects the driving control by an actuator, which substantially effects the positioning of the head. Since the effect of the friction on the positioning mechanism lowers the positioning accuracy, it raises an important problem as the disk apparatus is becoming smaller in size and higher in density.

The positioning mechanism by an actuator provided in the disk apparatus includes a linear actuator called a linear acting type and a rotary actuator called a swinging type. Both the linear actuator and rotary actuator are guided by a roller bearing portion.

A bearing portion constantly generates a friction force that is a reaction force with respect to a movement of a head support mechanism driven by an actuator. For example, when the actuator starts to be driven from a state in which the head support mechanism is stopped, the actuator is required to generate a driving force grater than the friction force based on the static friction between the bearing portion and the head support mechanism.

Furthermore, after the head support mechanism is started to move, friction force based on the dynamic friction acts between the bearing portion and the head support mechanism. In general, in order to move a movable portion such as a head support mechanism, the static friction needs larger driving force as compared with dynamic friction. Therefore, in the mechanism carrying out the moving operation using such a bearing portion, due to the difference between the static friction and the dynamic friction, a smooth moving operation becomes difficult, which may lead to an inaccurate positioning servo control.

Furthermore, since the bearing portion is miniaturized in accordance with the miniaturization of the disk apparatus, the effect of the friction force on the movement of the head support mechanism becomes more significant. Furthermore, since the head support mechanism also is smaller and lighter, similar to the friction force, for example, the reaction force generated due to the flexible printed circuit (hereinafter, referred to as FPC) for transmitting electric signals in a state in which it is connected to the head affects the movement of the head support mechanism significantly.

Thus, in accordance with the miniaturization of the disk apparatus, friction force of the bearing portion, reaction force of FPC and actuator vibration due to spindle vibration may inhibit the increase in recording density.

Then, in order to carry out the positioning of a magnetic head at high speed and with high accuracy, it is predicted that future general magnetic disks have a configuration including two driving mechanisms, i.e., a coarse actuator and a fine actuator.

The coarse actuator such as a voice coil motor (VCM) moves a head support mechanism, a slider and a magnetic head by rotating the head support mechanism around an axis provided at a chassis. The coarse actuator is mainly used for a long-distant movement such as seek/setting, a jumping a plurality of tracks, and the like.

The fine actuator drives a magnetic head or a slider. The fine actuator mainly is used for carrying out micro and high-speed positioning such as tracking or one-track jump, etc. The fine actuator also is referred to as a "micro actuator" (MA).

The magnetic head reads servo information recorded on a magnetic disk (information on the present position of the head). By controlling the coarse actuator and fine actuator, based on the servo information, a magnetic head mounted on the slider is allowed to access an arbitrary position on the magnetic disk so as to carry out positioning.

As compared with the conventional coarse actuator, the fine actuator can be control driven in high frequency zone and can carry out positioning of the magnetic head while suppressing the influence of the bearing friction.

A mechanism having a coarse actuator and a fine actuator is generally referred to as a Piggyback actuator or a dual-stage actuator or a dual stage actuator.

A controlling method having a configuration in which positioning at high speed and with high accuracy is carried out using this dual-stage actuator has been proposed. A conventional example of the control method using the dual-stage actuator will be mentioned below.

FIG. 24 is a block diagram showing a configuration of a servo control system in a dual-stage actuator described in JP4-368676A (U.S. Pat. No. 3,089,709).

In FIG. 24, a fine actuator G2 (S) carries out positioning of a head by feeding back a head position error (error between the targeted position and the position of the present position of the head) detected by a head signal; and a coarse actuator G1 (S) carries out positioning by feeding back a signal obtained by adding the displacement amount of the fine actuator G2 (S) to the head position error, thus achieving cooperative control.

Herein, the fine actuator G2 (S) is configured by a piezoelectric element and since the displacement amount is proportion to an input signal (input voltage) to the piezoelectric element, based on the input signal to the fine actuator G2 (S), the displacement amount of the fine actuator G2 (S) can be estimated.

Furthermore, a signal obtained by adding the displacement amount of the fine actuator G2 (S) to the position error corresponds to the position error between the targeted position and the position to which the head moves by the coarse actuator G1 (S).

According to such a control method, while control-driving the fine actuator G2 (S) in the middle of the operation range, by the cooperative control of the coarse actuator G1 (S) and the fine actuator G2 (S), positioning of the head is carried out with high accuracy.

FIG. 25 is a block diagram showing a configuration of a servo control system in a dual-stage actuator described in JP11-219572A (U.S. Pat. No. 3,180,752).

In FIG. 25, a head position error signal 25 detected from the head signal (error between the targeted position and the position of the present position of the head) and a relative position detection signal 26 representing the relative position between the coarse actuator and the fine actuator detected by a capacitor sensor are fed back to the input controller 29 and thus the positioning of the head is carried out with high accuracy by the cooperative control of a micro tracking actuator controller 30 and a main actuator controller 31.

According to such a control method, while control driving is carried out in the middle range of the operation range of the fine actuator, the positioning of the head is carried out with high accuracy by the cooperative control of the coarse actuator and the fine actuator.

However, in the configuration shown in FIG. 24, since the cooperative control of the coarse actuator G1 (S) and the fine actuator G2 (S) is carried out based only on the position error by the head signal, the amount of displacement of the fine actuator G2 (S) is added to the input signal of the coarse actuator G1 (S). Therefore, the fine actuator G2 (S) is subjected to the disturbance of the operation of the coarse actuator G1 (S); and the coarse actuator G1 (S) is subjected to the disturbance of the operation of the fine actuator G2 (S). As a result, residual vibration occurs, which may lead to an increase in the setting time in positioning the head.

Therefore, with the configuration in which the control zone of the fine actuator G2 (S) is made to be higher than the control zone of the coarse actuator G1 (S), when the operation of the fine actuator G2 (S) is allowed to be dominant, although it is possible to obtain an effect of improving the problem in which the settling time in positioning of head is increased, there still has been a problem in that the occurrence of the vibration due to the cooperative operation cannot be eliminated.

Furthermore, in the configuration shown in FIG. 25, in order to detect the displacement amount of the fine actuator to the coarse actuator, a capacitor sensor is added. Therefore, the configuration of the dual-stage actuator becomes complicated and simultaneously the mass and moment of inertia are increased by the added capacity sensor, and therefore, high speed seek and high frequency zone control cannot be achieved.

SUMMARY OF THE INVENTION

It is an object of the present invention to provide a head positioning apparatus capable of positioning a head at high speed and with high accuracy.

The head positioning apparatus according to the present invention includes a magnetic head for recording/reproducing information on a rotary recording medium; a head support mechanism provided swingably on the recording medium while supporting the magnetic head; a coarse actuator for swinging the head support mechanism for coarsely positioning the magnetic head on the recording medium; a fine actuator provided in the head support mechanism for precisely positioning the magnetic head on the recording medium; a head position detector for detecting the head position representing the position of the magnetic head; and a fine movement control system for controlling the fine actuator based on the head position detected by the head position detector. The head positioning apparatus further includes a head moving distance estimator for estimating a head moving distance representing a distance the magnetic head moves based on VCM Back EMF voltage generated in the coarse actuator; and a coarse movement control system for controlling the coarse actuator based on the head moving distance estimated by the head moving distance estimator.

In the head positioning apparatus according to the embodiments of the present invention, the head moving distance estimator estimates a head moving distance representing the distance the magnetic head moves based on VCM Back EMF voltage generated in the coarse actuator and the coarse movement control system controls the coarse actuator based on the head moving distance estimated by the head moving distance estimator. Therefore, since it is possible to reduce mutual interference between the coarse movement control system and fine movement control system, cooperative control of the coarse movement control system and the fine movement control system with respect to the vibration of the fine movement control system in the high frequency zone can be carried out.

It is preferable that the coarse actuator includes a voice coil motor.

It is preferable that the head moving distance estimator includes a head absolute speed estimator for estimating a head absolute speed representing the absolute speed of the magnetic head based on the VCM Back EMF voltage; and a coarse movement distance estimator for estimating the head moving distance based on the head absolute speed estimated by the head absolute speed estimator.

It is preferable that the coarse movement moving distance estimator estimates the head moving distance based on the integration of the head absolute speed.

It is preferable that the coarse movement moving distance estimator estimates the head moving distance based on the integration of the head absolute speed by setting the initial value of the head moving distance to zero.

It is preferable that the fine movement control system includes a fine movement controller for generating the control signal for controlling the fine actuator based on the head position detected by the head position detector; and further includes a fine movement head moving distance estimator for estimating the fine movement head moving distance representing the amount that the magnetic head is moved by the fine actuator based on the control signal generated by the fine movement controller; and that the coarse movement moving distance estimator estimates the head moving distance by defining the coarse movement head moving distance representing the amount that the magnetic head is moved by the coarse actuator, which is obtained by subtracting the fine movement head moving distance estimated by the fine movement head moving distance estimator from the head position detected by the head position detector, as a initial value.

It is preferable that the coarse movement control system receives any of the coarse movement head moving distance obtained by subtracting the fine movement head moving distance from the head position, the head moving distance estimated by the coarse movement moving distance estimator, and the head position detected by the head position detector, in accordance with the magnitude of the fine movement head moving distance estimated by the head moving distance estimator and the error with respect to a targeted position of the head position detected by the head position detector.

It is preferable that the fine movement control system includes a fine movement controller for generating a fine control signal for controlling the fine actuator based on the head position detected by the head position detector; the coarse movement control system includes a coarse movement controller for generating the coarse movement control signal for controlling the coarse actuator based on the head moving distance estimated by the head moving distance detector; and the head position detector further includes a fine movement head moving distance estimator for estimating a fine movement head moving distance representing the amount that the magnetic head is moved by the fine actuator based on the fine movement control signal generated by the fine movement controller and the coarse movement control signal generated by the coarse movement controller, and that the coarse movement moving distance estimator estimates the head moving distance by defining the coarse movement head moving distance representing the amount that the magnetic head is moved by the coarse actuator, which is obtained by subtracting the fine movement head moving distance estimated by the fine movement head moving distance estimator from the head position detected by the head position detector, as a initial value.

It is preferable that the coarse movement controller receives any of the coarse movement head moving distance obtained by subtracting the fine movement head moving distance from the head position and the head moving distance estimated by the coarse movement moving distance estimator, in accordance with the magnitude of the fine movement head moving distance estimated by the fine movement head moving distance estimator.

It is preferable that the fine movement control system includes a fine movement controller for generating the control signal for controlling the fine actuator based on the head position detected by the head position detector; and the fine movement driving device for generating a driving signal for driving the fine actuator based on the control signal generated by the fine movement controller.

It is preferable that the fine actuator includes a piezoelectric element; the fine movement control system supplies a driving signal for driving the piezoelectric element to the piezoelectric element; a level of the driving signal is not more than a threshold value at which the property of the piezoelectric element changes; and the absolute value of the threshold value is larger than the absolute value of the decomposition voltage of lead.

It is preferable that the fine movement control system includes a fine movement controller for generating the control signal for controlling the fine actuator based on the head position detected by the head position detector; the fine movement driving device for generating a driving signal based on the control signal generated by the fine movement controller; and a driving signal limiter for supplying a signal for limiting the level of the driving signal to be not more than the threshold value to the fine movement driving device based on the control signal from the fine movement controller.

It is preferable that the absolute value of threshold value is larger than the absolute value of the decomposition voltage of water; and the voltage V (volt) of the driving signal and electric current I (ampere) flowing in the piezoelectric element satisfies the following relationship:

$(I/V)<10^{-6}$.

It is preferable that the absolute value of the threshold value is larger than the absolute value of the decomposition voltage of water; and the voltage V (volt) of the driving signal and the film thickness t (meter) of the piezoelectric element satisfies the following relationship:

$(V/t)<2\times10^{7}$.

It is preferable that the absolute value of the threshold value is larger than the absolute value of the decomposition voltage of water; and the driving signal has a voltage in which the electric resistance of the piezoelectric element is less than 1 MΩ.

It is preferable that the threshold value is set under the conditions in which the electric resistance value of the piezoelectric element is 1 MΩ or more even if driving is carried out at the temperature of 85° C. and the humidity of 90% for 500 hours continuously.

It is preferable that in the case where the compensation amount of the piezoelectric element is zero, the fine movement control system outputs a constant value of offset voltage when the voltage applied to the piezoelectric element is zero or not more than a half of the threshold voltage; and in the case where the compensation amount of the piezoelectric element is not zero, the fine movement control system is control-driven by adding positive/negative voltage in accordance with the value of the compensation amount to the offset voltage.

It is preferable that the head moving distance estimator includes a head absolute speed estimator for estimating the head absolute speed representing the absolute speed of the magnetic head based on the VCM Back EMF voltage generated in the coarse actuator; the coarse movement control system includes a coarse movement controller for generating the coarse movement control signal for controlling the coarse actuator based on the head moving distance estimated by the moving distance estimator; and the head positioning apparatus further includes a load estimator for generating the disturbance compensation signal for estimating the disturbance acting on the head positioning apparatus based on the head absolute speed estimated by the head absolute speed estimator and the coarse movement control signal generated by the coarse movement controller.

DESCRIPTION OF THE PREFERRED EMBODIMENTS

Hereinafter, embodiments of the present invention will be explained with reference to drawings.

EMBODIMENT 1

Figure 1:
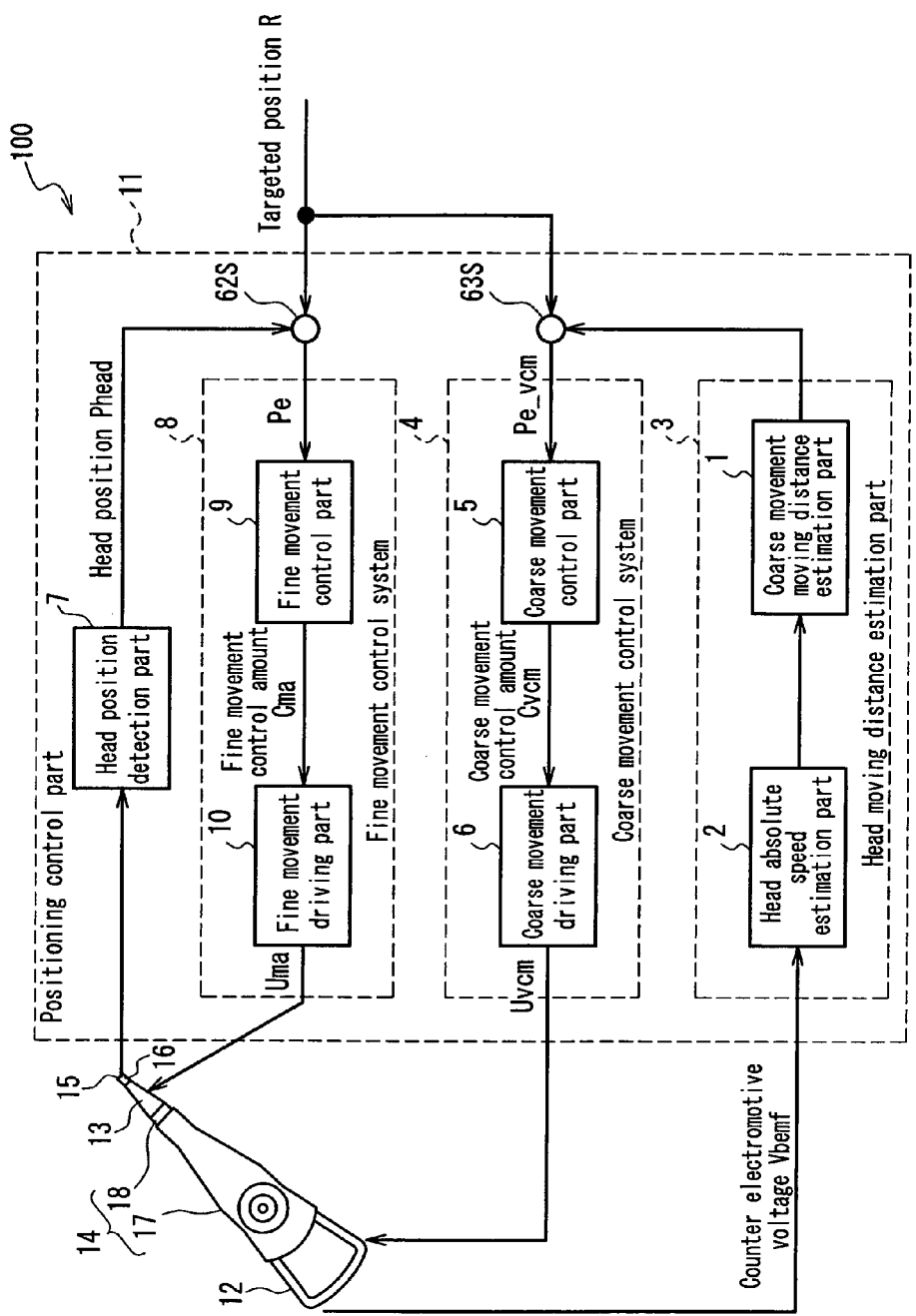
FIG. 1 is a schematic view showing a configuration of a head positioning apparatus according to Embodiment 1.
Figure 2:
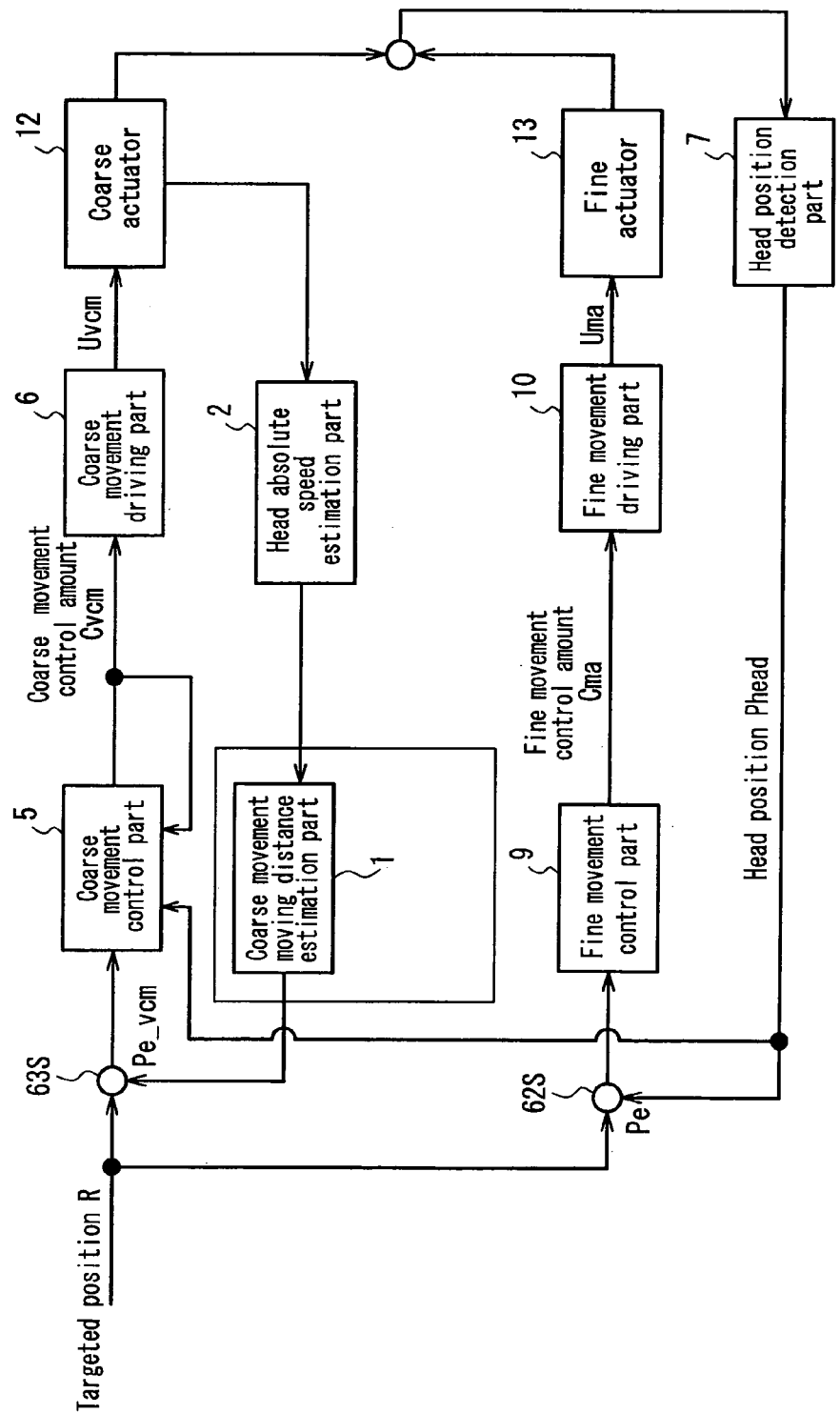
FIG. 2 is a control block diagram of a head positioning apparatus according to Embodiment 1.

FIG. 1 is a schematic view showing a configuration of a head positioning apparatus 100 according to Embodiment 1; and FIG. 2 is a control block diagram of the head positioning apparatus 100.

The head positioning apparatus 100 includes a head support mechanism 14. The head support mechanism 14 has an arm 17. The arm 17 is provided swingably around a spindle provided on a chassis (not shown). To the tip of the arm 17, a head support member 18 is attached.

Figure 3A:
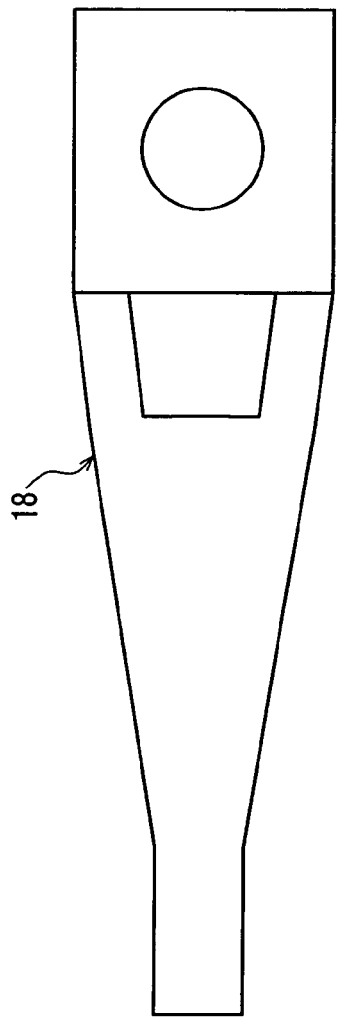
FIG. 3A is a plan view to explain a configuration of a head support member provided on the head positioning apparatus according to Embodiment 1.
Figure 3B:
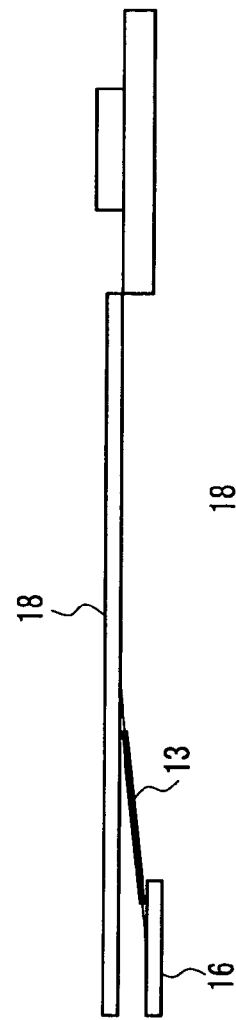
FIG. 3B is a side view thereof.
Figure 3C:
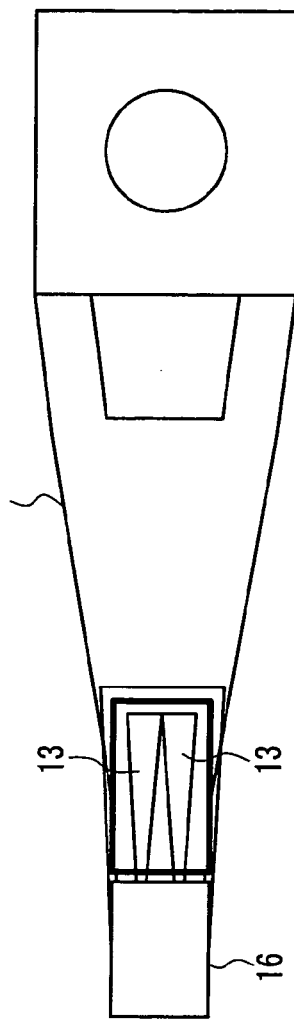
FIG. 3C is a bottom view thereof.
Figure 3D:
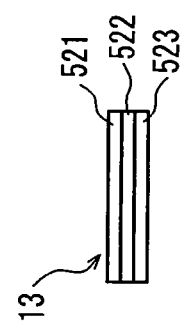
FIG. 3D is a side view showing a configuration of a fine actuator provided on the head support member of the head support mechanism.

FIG. 3A is a plan view to explain a configuration of the head support member 18; FIG. 3B is a side view thereof; FIG. 3C is a bottom view thereof; and FIG. 3D is a side view showing a configuration of a fine actuator 13 provided on the head support member 18.

At the tip of the head support member 18, a slider 16 is provided. On the slider 16, a magnetic head 15 is mounted for recording and reproducing information on a rotating recording medium (not shown). On the head support member 18, two fine actuators 13 are provided substantially in parallel along the longitudinal direction of the head support member 18. The fine actuator 13 is provided for precisely positioning a magnetic head 15 on a recording medium (not shown). Each of the fine actuators 13 is composed of a piezoelectric actuator and includes a piezoelectric element 522, and upper and lower electrodes 521 and 523 that are formed sandwiching the piezoelectric element 522. The fine actuator 13 is driven by a push-pull method and is configured in which a distortion amount of the piezoelectric element 522 is converted into the displacement amount of the magnetic head 15 by a magnification mechanism.

A coarse actuator 12 is provided at the opposite side to the magnetic head 15 with respect to the spindle of the arm 17. The coarse actuator 12 is composed of a voice coil motor (VCM) and swings the arm 17 so as to carry out positioning of the magnetic head 15 coarsely on a recording medium (not shown).

The head positioning apparatus 100 includes a positioning control part 11. The positioning control part 11 is provided with a head position detection part 7. The head position detection part 7 detects a head position Phead representing a position of the magnetic head 15 and supplies the detected position to a subtractor 62S. The subtractor 62S generates a position error signal Pe representing the difference between the detected head position Phead and the targeted position R.

The positioning control part 11 has a fine movement control system 8. The fine movement control system 8 is provided with a fine movement control part 9.

Figure 4:
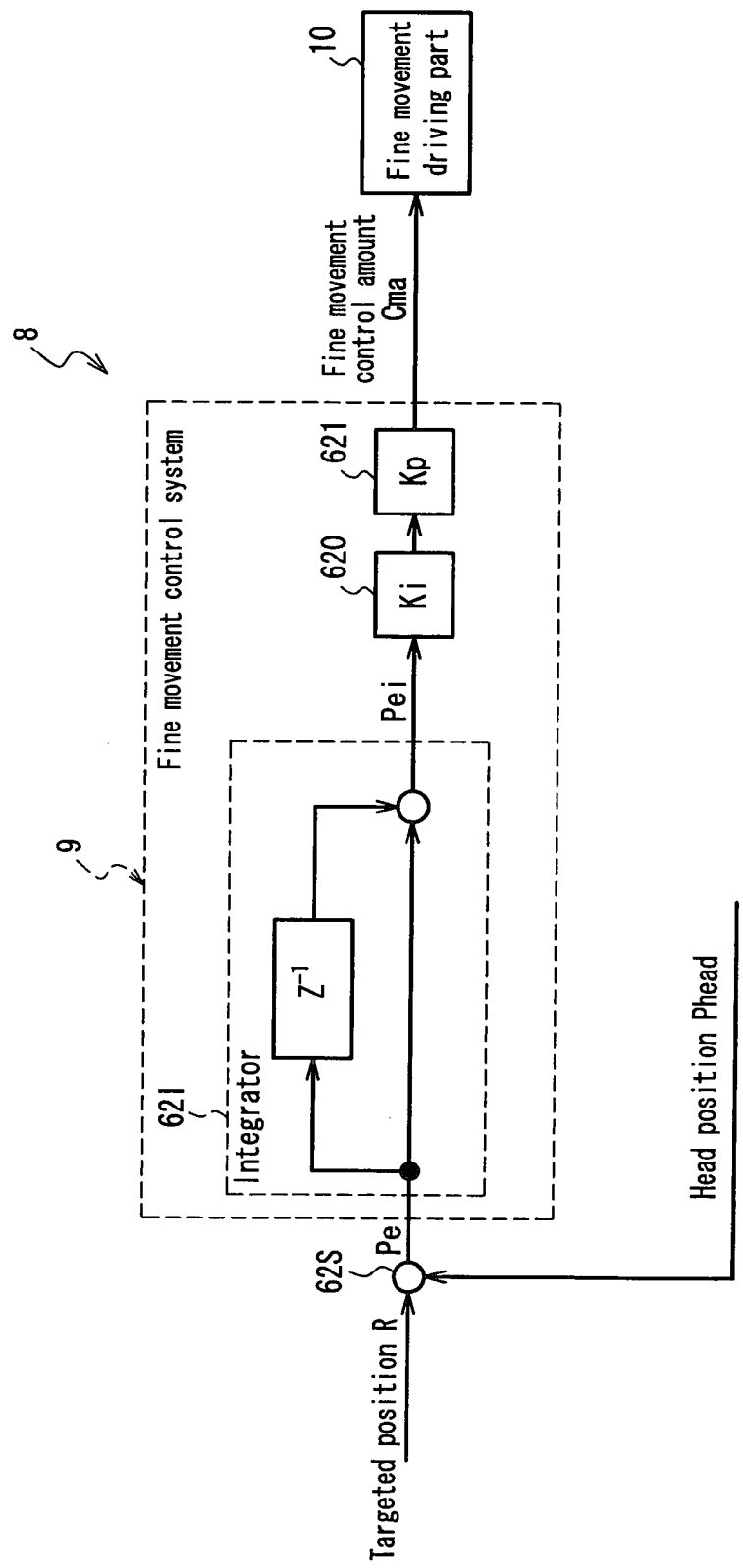
FIG. 4 is a block diagram to explain a configuration of a fine movement control system provided in the head positioning apparatus according to Embodiment 1.

FIG. 4 is a block diagram to explain a configuration of the fine movement control part 9. The fine movement control part 9 has an integrator 62I. The integrator 62I generates a position error integration signal Pei based on the position error signal Pe generated by the subtractor 62S and supplies the signal Pei to a multiplier 620 provided in the fine movement control part 9. The multiplier 620 multiplies the position error integral signal Pei supplied from the integrator 62I by an integral gain Ki and supplies it to a multiplier 621 provided in the fine movement control part 9. The multiplier 621 multiplies the output from the multiplier 620 by a proportion gain Kp to generate a fine movement control signal Cma and supplies it to a fine movement driving part 10.

The fine movement driving part 10 generates a driving signal Uma for driving the fine actuator 13 based on the fine movement control signal Cma supplied from the fine movement control part 9 and supplies the signal to the fine actuator 13.

The positioning control part 11 has a head moving distance estimation part 3. The head moving distance estimation part 3 is provided with a head absolute speed estimation part 2.

Figure 5:
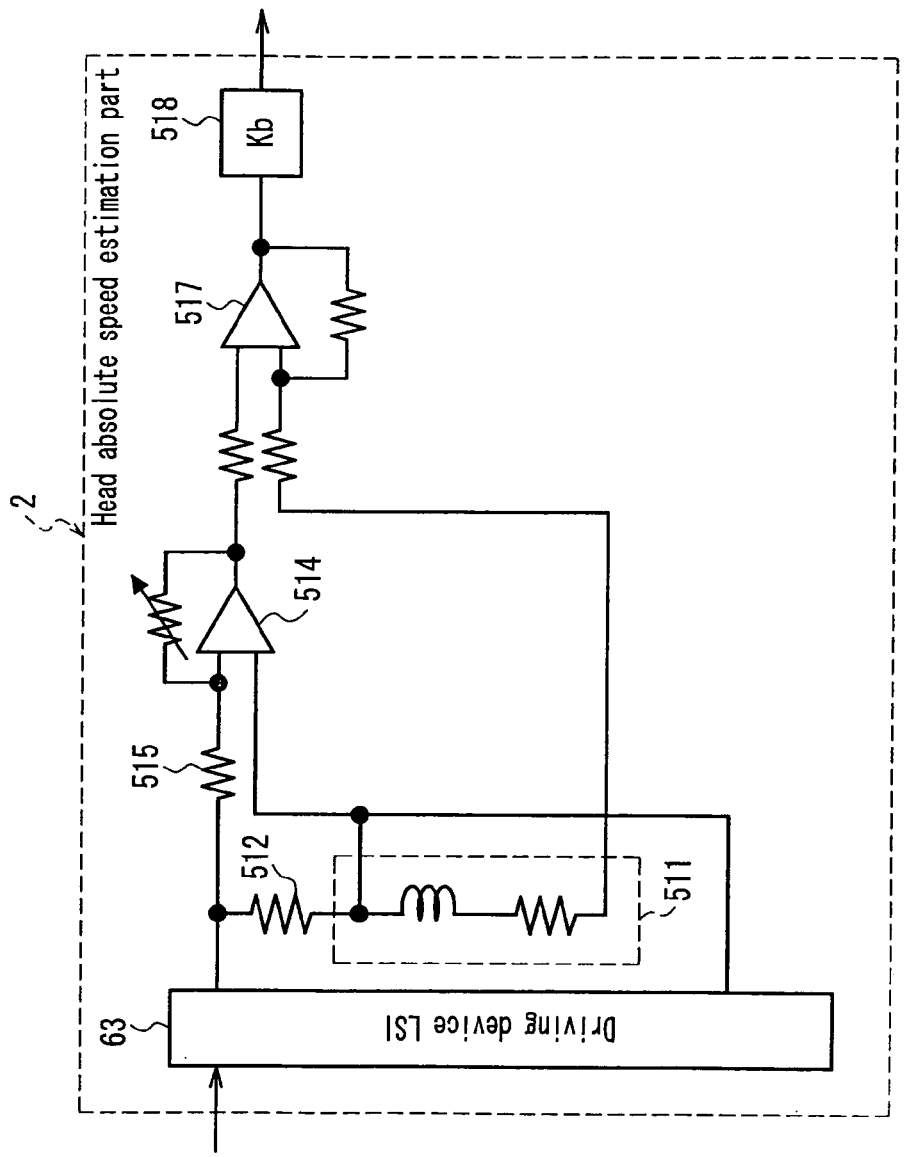
FIG. 5 is a circuit diagram showing a configuration of a head absolute speed estimation part provided in the head positioning apparatus according to Embodiment 1.

FIG. 5 is a circuit diagram showing a configuration of the head absolute speed estimation part 2. A detection resistor 512 is provided in series with a coil 511 provided in a coarse actuator 12. A driving device LSI 63 applies a voltage to both ends of the detection resistor 512 so that control driving current that is in proportion to the control signal flows to both ends of the detection resistor 512. Difference detection part 514 and 517 detect a VCM Back EMF voltage signal Vbemf that is in proportion to the moving speed of the magnetic head 15 driven by the coarse actuator 12 and multiply the VCM Back EMF voltage signal Vbemf by a speed conversion gain Kb so as to generate an absolute speed Vvcm of the magnetic head 15 driven by the coarse actuator 12.

The head moving distance estimation part 3 has a coarse movement distance estimation part 1. The coarse movement distance estimation part 1 estimates the head moving distance, representing the distance which the magnetic head 15 moves, based on the absolute speed Vvcm of the magnetic head 15 generated by the head absolute speed estimation part 2 and supplies the estimated distance to a subtractor 63S.

The subtractor 63S generates an estimated position error signal Pe_vcm representing the difference between the head moving distance estimated by the coarse movement distance estimation part 1 and the targeted position R.

Figure 6:
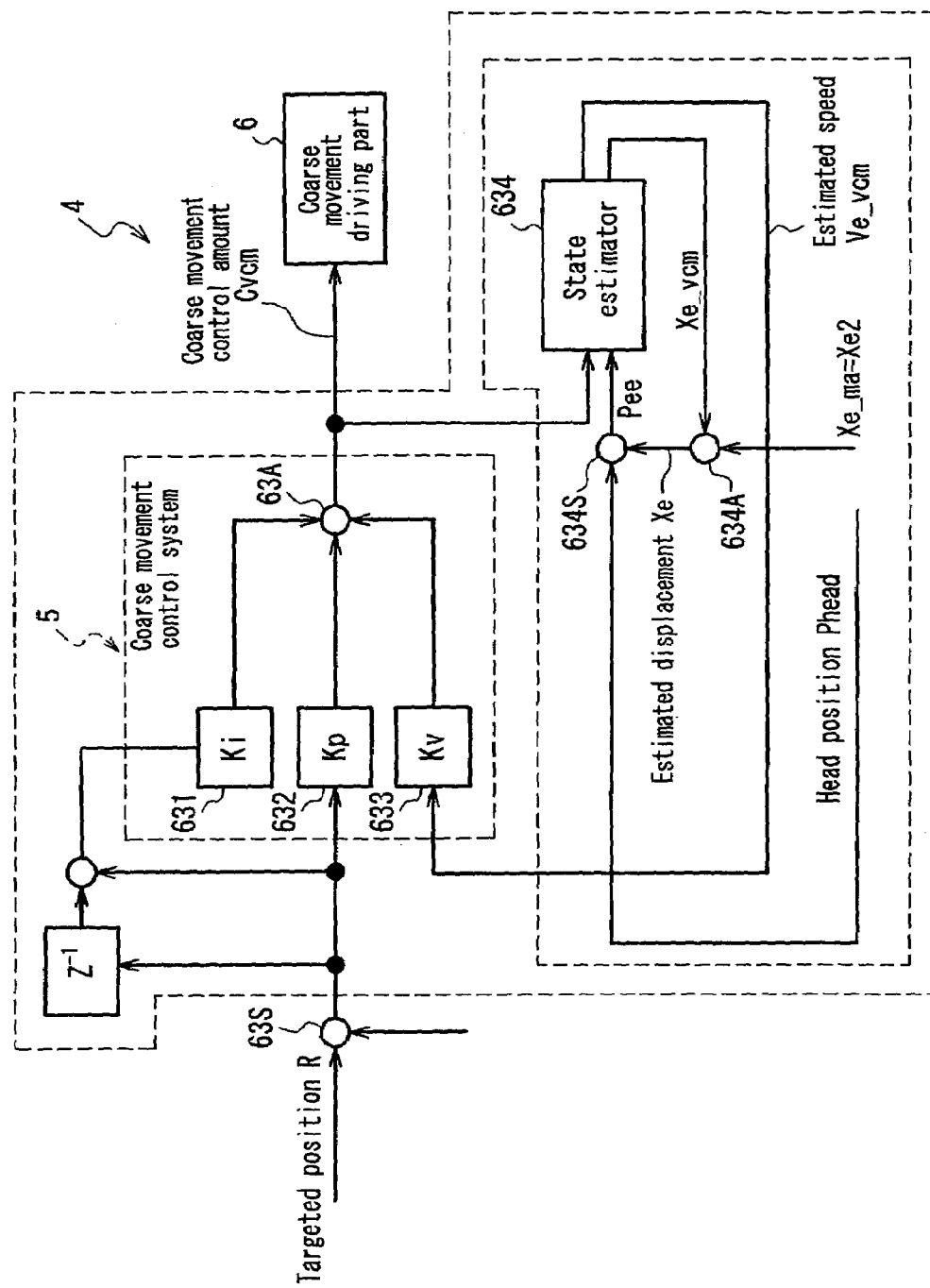
FIG. 6 is a block diagram to explain a configuration of a coarse movement control system provided in the head positioning apparatus according to Embodiment 1.

The positioning control part 11 has a coarse movement control system 4. FIG. 6 is a block diagram to explain a configuration of the coarse movement control system 4. The coarse movement control system 4 is provided with a coarse movement control part 5. The coarse movement control part 5 has an integral feedback gain 631, a position error feedback gain 632 and a speed feedback gain 633. The integral feedback gain 631 multiplies an integrated value of the estimated position error signal Pe_vcm generated by the subtractor 63S by the feedback gain Ki and outputs the result to an adder 63A. The position error feedback gain 632 multiplies the position error signal Pe_vcm generated by the subtractor 63S by the feedback gain Kp and outputs the result to the adder 63A. The speed feedback gain 633 multiplies an estimated speed Ve_vcm output from the state estimator 634 by a feedback gain Kv and outputs the result to the adder 63A.

The adder 63A supplies a coarse movement control signal Cvcm obtained by adding the output from the integral feedback gain 631, the output from the position error signal feedback gain 632 and the output from the speed feedback gain 633 to the coarse movement driving part 6 and the state controller 634.

The state controller 634 generates an estimated head moving speed signal Ve3 and an estimated movement position error signal Xe3 based on the coarse movement control signal Cvcm from the coarse movement control part 5 and a compensation signal Pee for reducing the estimated error of the state estimator 634, and supplies the generated estimated head moving speed signal Ve3 to the speed feedback gain 633 of the coarse movement control part 5 and supplies the generated estimated movement position error signal Xe3 to the adder 634A.

Figure 7:
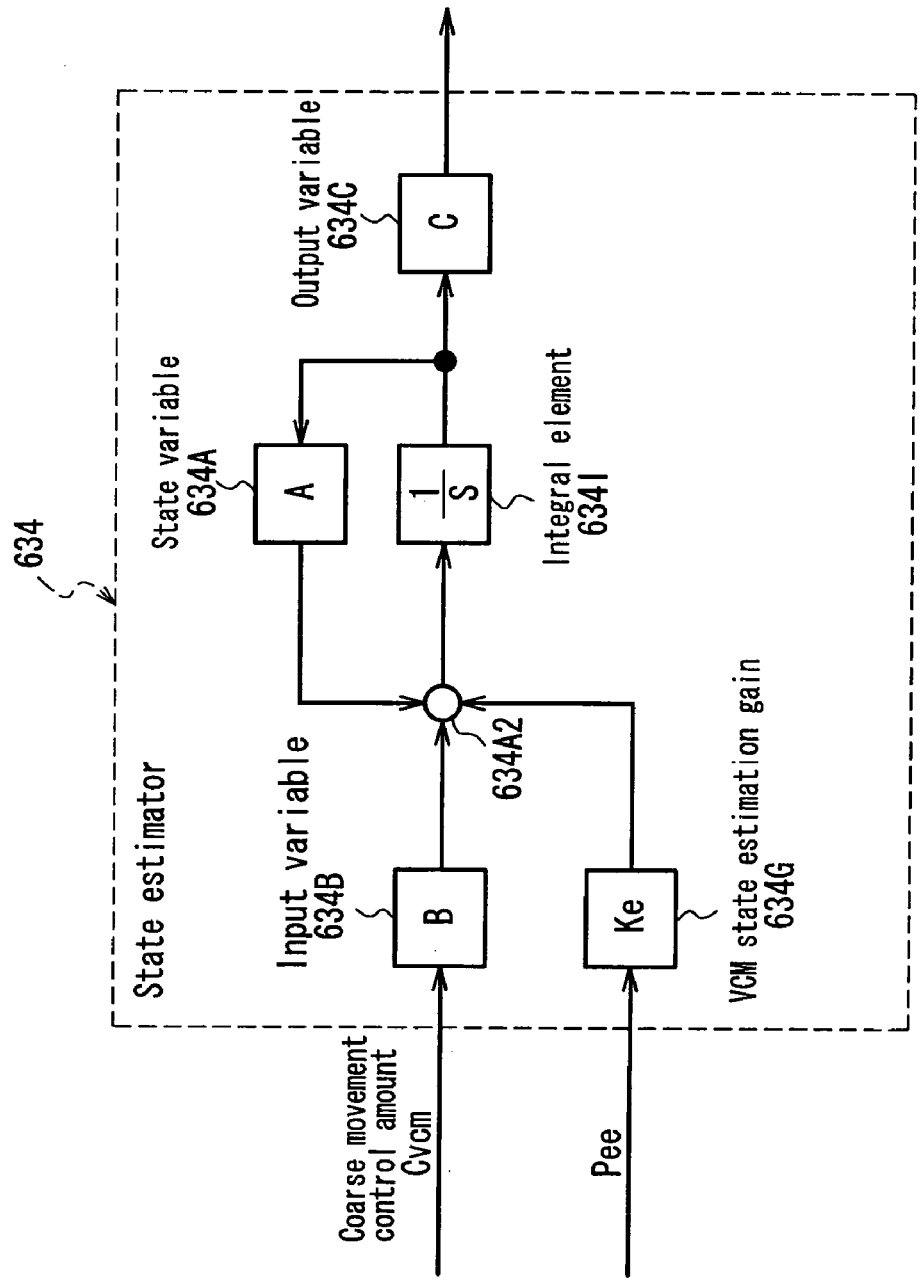
FIG. 7 is a block diagram showing a configuration of the state estimator provided in the coarse movement control system of the head positioning apparatus according to Embodiment 1.

FIG. 7 is a block diagram showing a configuration of the state estimator 634. The state estimator 634 is provided with a VCM state estimation gain 634G and an input variable 634B. The VCM state estimation gain 634G multiplies a compensation signal Pee supplied from the adder 634A by a gain Ke and outputs the result to an adder 634A2. The input variable 634B multiplies the coarse movement control signal Cvcm supplied from the coarse movement control part 5 by a variable B so as to output the result to the adder 634A2.

The adder 634A2 adds the output from the VCM state estimation gain 634G and the output from the input variable 634B so as to supply the result to an integrated element 634I. The output from the 634I is supplied and supplies the total output to the output variable 634C and at the same time fed back to the adder 634A2 in a state in which the variable B is multiplied by the state variable 634A.

The adder 634A adds the estimated movement position error signal Xe3 supplied from the state controller 634 and an estimated head position signal Xe2 by the fine actuator 13 to calculate a total estimated head position signal Xe by the fine actuator 13 and the coarse actuator 12 and outputs the total signal to the subtractor 634S.

The subtractor 634S generates a compensation signal Pee obtained by subtracting the total estimated head position signal Xe from the head position signal Phead detected by the head position detection part 7 and supplies the compensation signal to the state controller 634.

The coarse movement control system 4 has a coarse movement driving part 6. The coarse movement driving part 6 generates a driving signal Uvcm for driving the coarse actuator 12 based on the coarse movement control signal Cvcm generated by the coarse movement control part 5 and supplies the signal to the coarse actuator 12.

With the positioning control part 11 mentioned above, the fine actuator 13 is control driven so that the magnetic head 15 is positioned on a targeted track formed on the magnetic disk based on the head position Phead representing the position of the magnetic head 15. On the other hand, the coarse actuator 12 is control driven so that it can carry out the positioning (rested) of the magnetic head 15 in the vicinity of the targeted track formed on the magnetic disk independently from the head position Phead representing the position of the magnetic head 15.

Figure 8B:
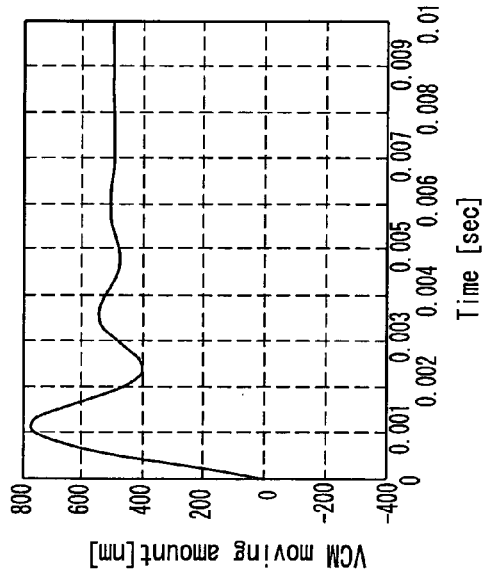
FIG. 8B is a simulation result showing a change over time of a VCM movement amount in the head positioning apparatus according to Embodiment 1.
Figure 8D:
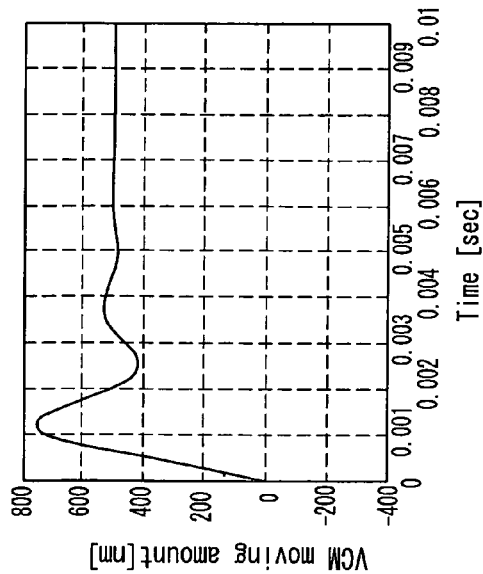
FIG. 8D is a simulation result showing a change over time of a VCM movement amount in a conventional head positioning apparatus.
Figure 8A:
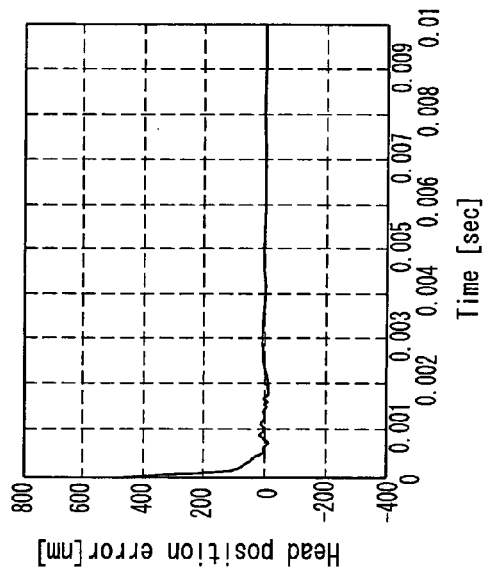
FIG. 8A is a simulation result showing a change over time of a head position error in the head positioning apparatus according to Embodiment 1.
Figure 8C:
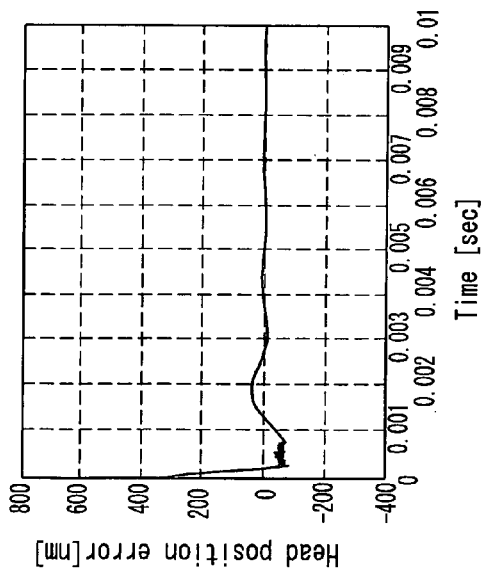
FIG. 8C is a simulation result showing a change over time of a head position error in a conventional head positioning apparatus.

FIG. 8A is a simulation result showing a change over time of a head position error in the head positioning apparatus 100 according to Embodiment 1; FIG. 8B is a simulation result showing a change over time of a VCM movement amount in the head positioning apparatus; FIG. 8C is a simulation result showing a change over time of a head position error in a conventional head positioning apparatus; and FIG. 8D is a simulation result showing a change over time of a VCM movement amount in a conventional head positioning apparatus.

The following are the conditions for the simulation:
Number of rotation: 3000 r/min
Track density: 70000 tracks/inch
Track pitch: 0.36 μm
Sampling frequency: 15 kHz
Servo bandwidth: 1.5 kHz FIGS. 8A and 8B show simulation results in a case where the movement amount and speed of the coarse actuator based on the VCM Back EMF voltage are input in the servo loop of the coarse actuator under the conditions of Embodiment 1. As shown in FIGS. 8A and 8B, although a voltage applied to the fine actuator 13 is limited, it is possible to maintain the positioning accuracy stably.

Thus, in Embodiment 1, in the head positioning control by a cooperative control of the dual-stage actuator, the fine actuator 13 feedback controls the head position error signal Pe based on the head position signal Phead; and the coarse actuator 12 estimates the head moving distance by the coarse actuator 12 by adding an integrator to an estimator to which a VCM Back EMF voltage signal Vbemf from the coarse actuator 12 is input, and feedback controls the position error signal by the coarse actuator 12 based on the estimated value so as to carry out the cooperative control.

As mentioned above, according to Embodiment 1, the moving distance of the head by the coarse actuator is estimated based on the speed estimated by the VCM Back EMF voltage signal and the coarse movement control system is configured by the estimated moving distance. At the same time, the fine movement control system is configured based on the head position error by the head position signal. Thereby, cooperative control can be carried out in a high frequency zone with the mutual interference between the operations of the two actuators reduced. Therefore, it is possible to allow a head to follow a track while suppressing the position error due to friction, FPC reaction force and vibration and to carry out head positioning control at high speed and with high accuracy.

As a result, it is possible to provide a head positioning control apparatus having an excellent effect capable of positioning servo control with a stable operation while reducing the mutual interference of the dual-stage actuator without the head positioning operation being affected by vibration or static friction.

EMBODIMENT 2

Figure 9:
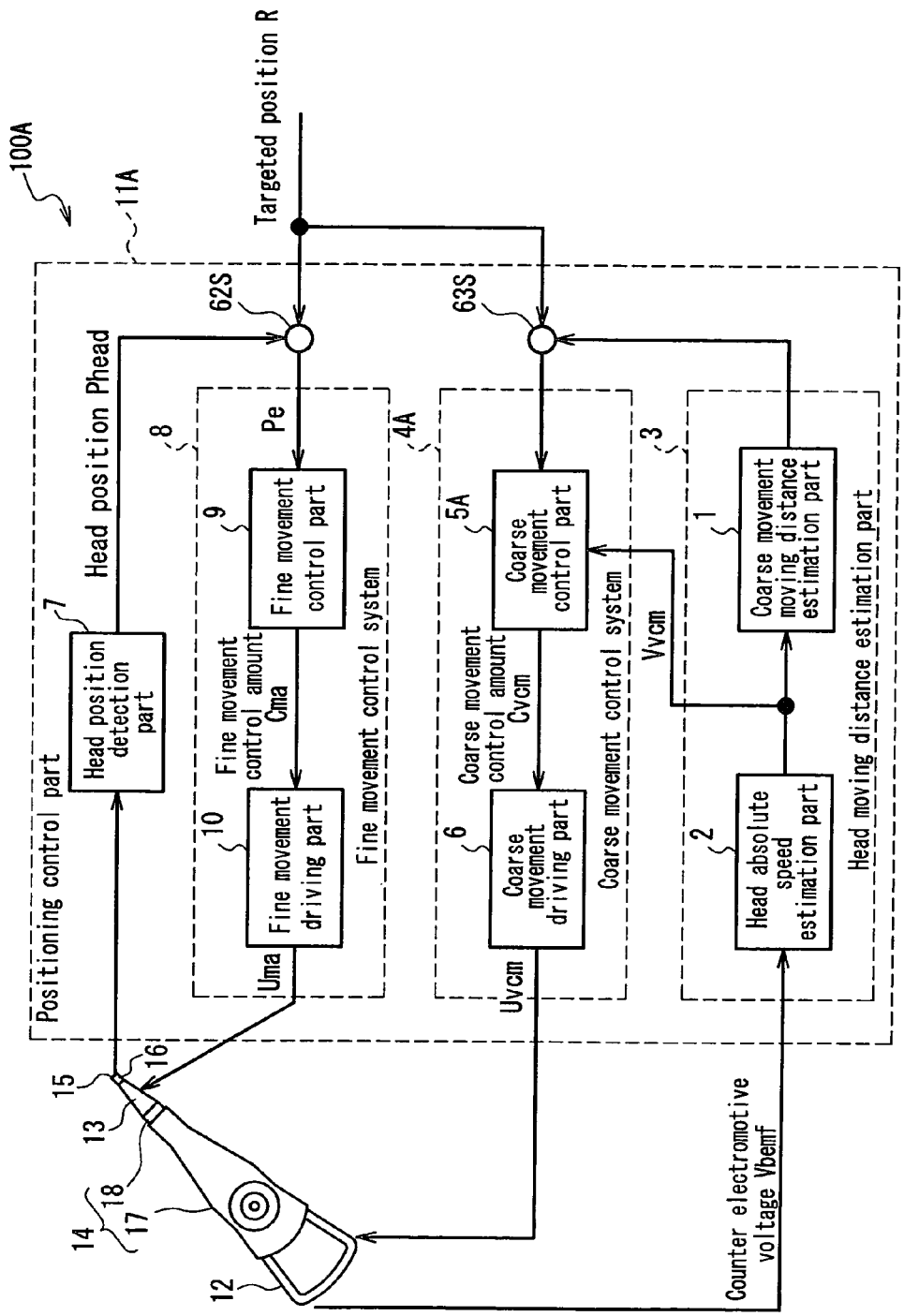
FIG. 9 is a schematic view showing a configuration of a head positioning apparatus according to Embodiment 2.

FIG. 9 is a schematic view showing a configuration of a head positioning apparatus 100A according to Embodiment 2. The same reference numbers are given to the same constituent elements as those of the head positioning apparatus 100 mentioned mentioned in Embodiment 1 with reference to FIG. 1 and therefore detailed explanations for these constituent elements are omitted herein.

The difference between the head positioning apparatus 100A and the head positioning apparatus 100 mentioned above is in that the head positioning apparatus 100A includes a positioning control part 11A instead of the positioning control part 11. The positioning control part 11A includes a coarse movement control system 4A.

Figure 10:
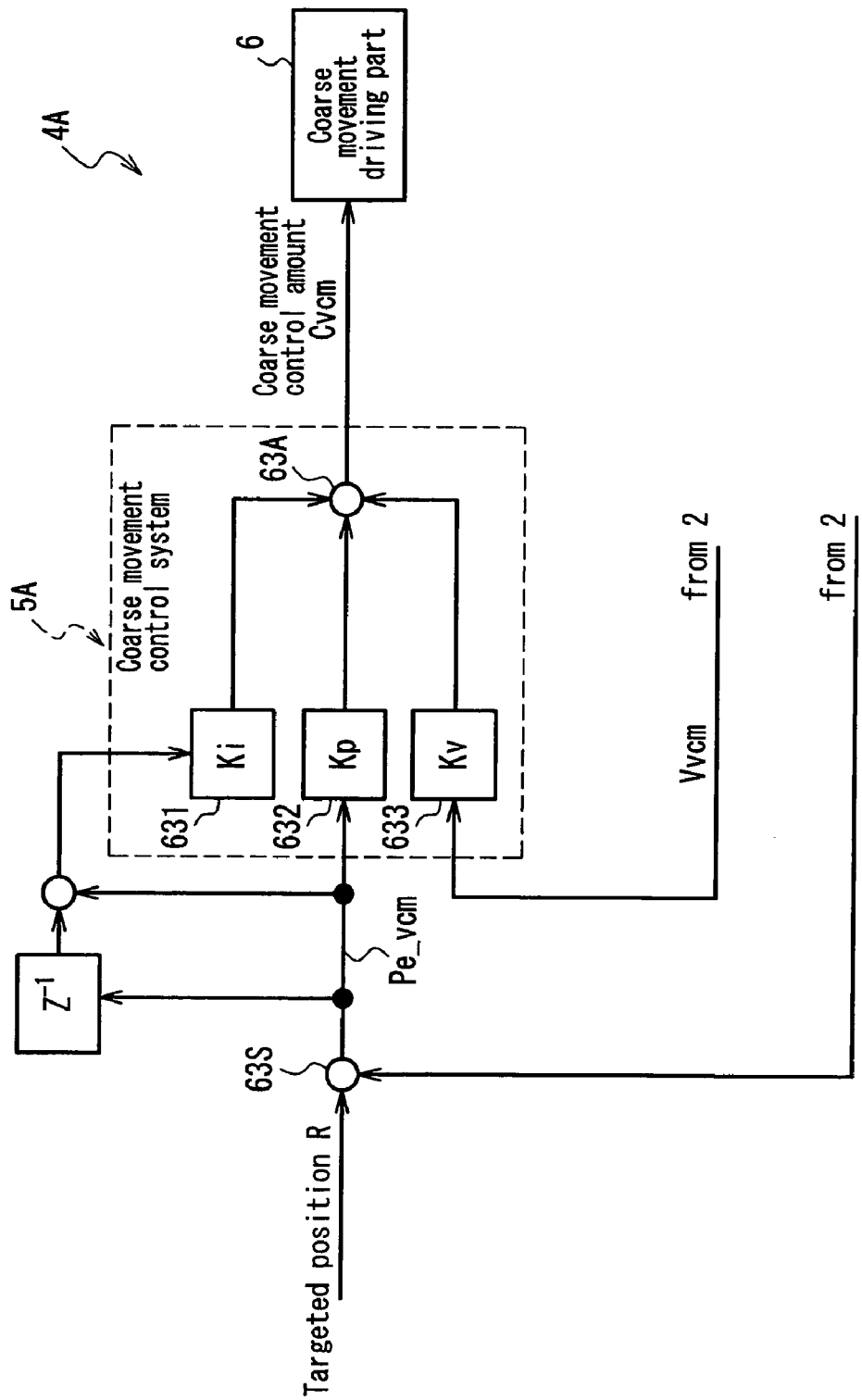
FIG. 10 is a block diagram to explain a configuration of a coarse movement control system provided in the head positioning apparatus according to Embodiment 2.

FIG. 10 is a block diagram to explain a configuration of the coarse movement control system 4A. The coarse movement control system 4A is provided with a coarse movement control part 5A. The coarse movement control part 5A has the speed feedback gain 633. The speed feedback gain 633 multiplies an absolute speed Vvcm of the magnetic head 15 estimated by the head absolute speed estimation part 2 by the feedback gain Kv and outputs the result to an adder 63A.

The adder 63A supplies a coarse movement control signal Cvcm obtained by adding the output from the integral feedback gain 631, the output from the position error feedback gain 632 and the output from the speed feedback gain 633 to a coarse movement driving part 6.

With the above-mentioned configuration, the coarse movement control part 5A control-drives a coarse actuator 12 via the coarse movement driving part 6 so that the moving speed of the magnetic head 15 by the coarse actuator 12 is made to be 0.

That is to say, in Embodiment 2, by the coarse actuator 12, the magnetic head 15 is allowed to rest in the vicinity of the targeted track on the magnetic disk and to allow the magnetic head 15 to follow the target track by only the fine actuator 13.

As mentioned above, according to Embodiment 2, based on the estimated speed by the VCM Back EMF voltage signal Vbemf, moving distance of the magnetic head 15 by the coarse actuator 12 is estimated and a coarse movement control system 4A is configured by the estimated moving distance, and based on the head position error Pe by the head position signal Phead, a fine movement control system 8 is configured. Thereby, by reducing the mutual interference of the operations of the two actuators, the cooperative control can carried out in a high frequency zone. Therefore, while suppressing the position error due to the friction, FPC reaction force and vibration, it is possible to allow the magnetic head 15 to follow the track. Thus, it is possible to achieve the head positioning control at high speed and with high accuracy.

As a result, it is possible to provide a head positioning control apparatus having an excellent effect capable of positioning servo control with a stable operation while reducing the mutual interference of the dual-stage actuator without the head positioning operation being affected by vibration or static friction.

EMBODIMENT 3

Figure 11:
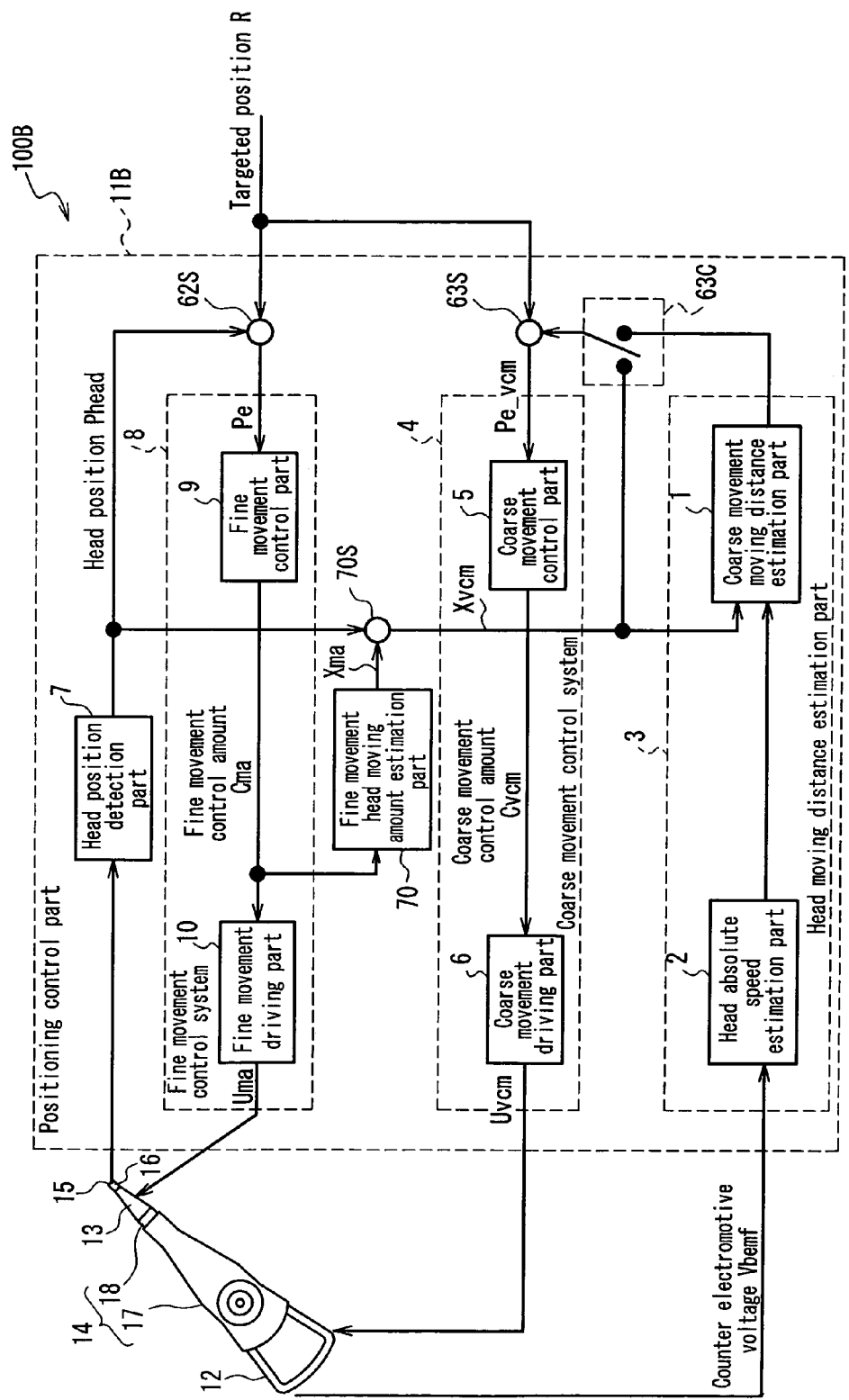
FIG. 11 is a schematic view showing a configuration of a head positioning apparatus according to Embodiment 3.
Figure 12:
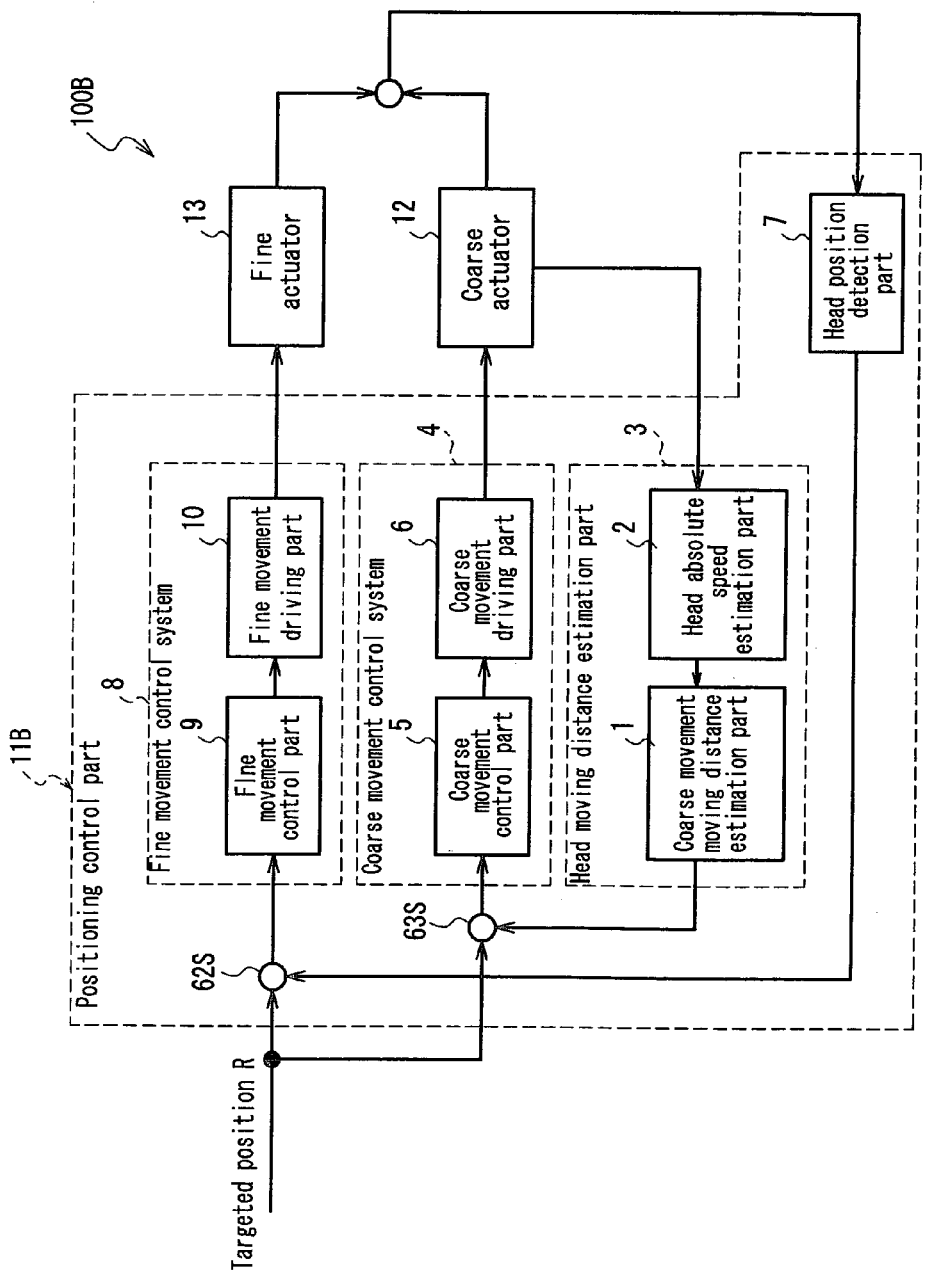
FIG. 12 is a control block diagram showing the head positioning apparatus according to Embodiment 3.

FIG. 11 is a schematic view showing a configuration of a head positioning apparatus 100B according to Embodiment 3. FIG. 12 is a control block diagram of the head positioning apparatus 100B. The same reference numbers are given to the same constituent elements as those of the head positioning apparatus 100 mentioned in Embodiment 1 with reference to FIG. 1 and therefore detailed explanations for these constituent elements are omitted herein. The difference between the head positioning apparatus 100B and the head positioning apparatus 100 mentioned above is that the head positioning apparatus 100B further includes a fine movement head moving distance estimation part 70, a subtractor 70S and a selector 63C.

The fine movement head moving distance estimation part 70 estimates a fine movement head moving distance Xma representing the moving distance of the magnetic head 15 by the fine actuator 13 based on the fine movement control signal Cma generated by the fine movement control part 9.

The subtractor 70S supplies the head moving distance Xvcm by the fine actuator 12, obtained by subtracting the fine movement head moving distance Xma estimated by the fine movement head moving distance estimation part 70 from the head position Phead detected by the head position detection part 7, to a coarse movement moving distance estimation part 1 and a selector 63C.

A coarse movement distance estimation part 1 estimates the head moving distance based on the absolute speed Vvcm of the magnetic head 15 generated by the head absolute speed estimation part 2 by using the head moving distance Xvcm supplied from the subsractor 70S as an initial value and supplies the estimated distance to the selector 63C.

The selector 63C selects the head moving distance Xvcm supplied from the subtractor 70S and supplies it to the subtractor 63S when the fine movement head moving distance Xma estimated by the fine movement moving distance estimation part 70 is 10% or more with respect to the track pitch. The selector 63C selects the head moving distance estimated by the coarse movement moving distance estimation part 1 and supplies it to the subtractor 63S when the fine movement head moving distance Xma is less than 10% with respect to the track pitch.

Thus, the fine actuator 13 is control-driven so that the magnetic head 15 is positioned on the targeted track on the magnetic disk based on the head position Phead of the magnetic head 15. When the displacement amount of the fine actuator 13 is smaller than the threshold value, the coarse actuator 12 is control-driven so that the magnetic head 15 is positioned (rested) in the vicinity of the targeted track on the magnetic disk independently from the head position Phead.

As mentioned above, according to Embodiment 3, moving distance of the magnetic head 15 by the coarse actuator 12 is estimated based on the estimated speed by the VCM Back EMF voltage signal Vbemf and the coarse movement control system 4 is configured by the estimated moving distance. At the same time, the fine movement control system 8 is configured based on the head position error by the head position signal Phead. Thereby, cooperative control can be carried out in a high frequency zone with the mutual interference between the operations of the two actuators reduced. Therefore, it is possible to allow the magnetic head to follow a track while suppressing the position error due to friction, FPC reaction force and vibration and to carry out head positioning control at high speed and with high accuracy.

As a result, it is possible to provide a head positioning control apparatus having an excellent effect capable of positioning servo control by a stable operation while reducing the mutual interference of the dual-stage actuator without the head positioning operation being affected by vibration or static friction.

EMBODIMENT 4

Figure 13A:
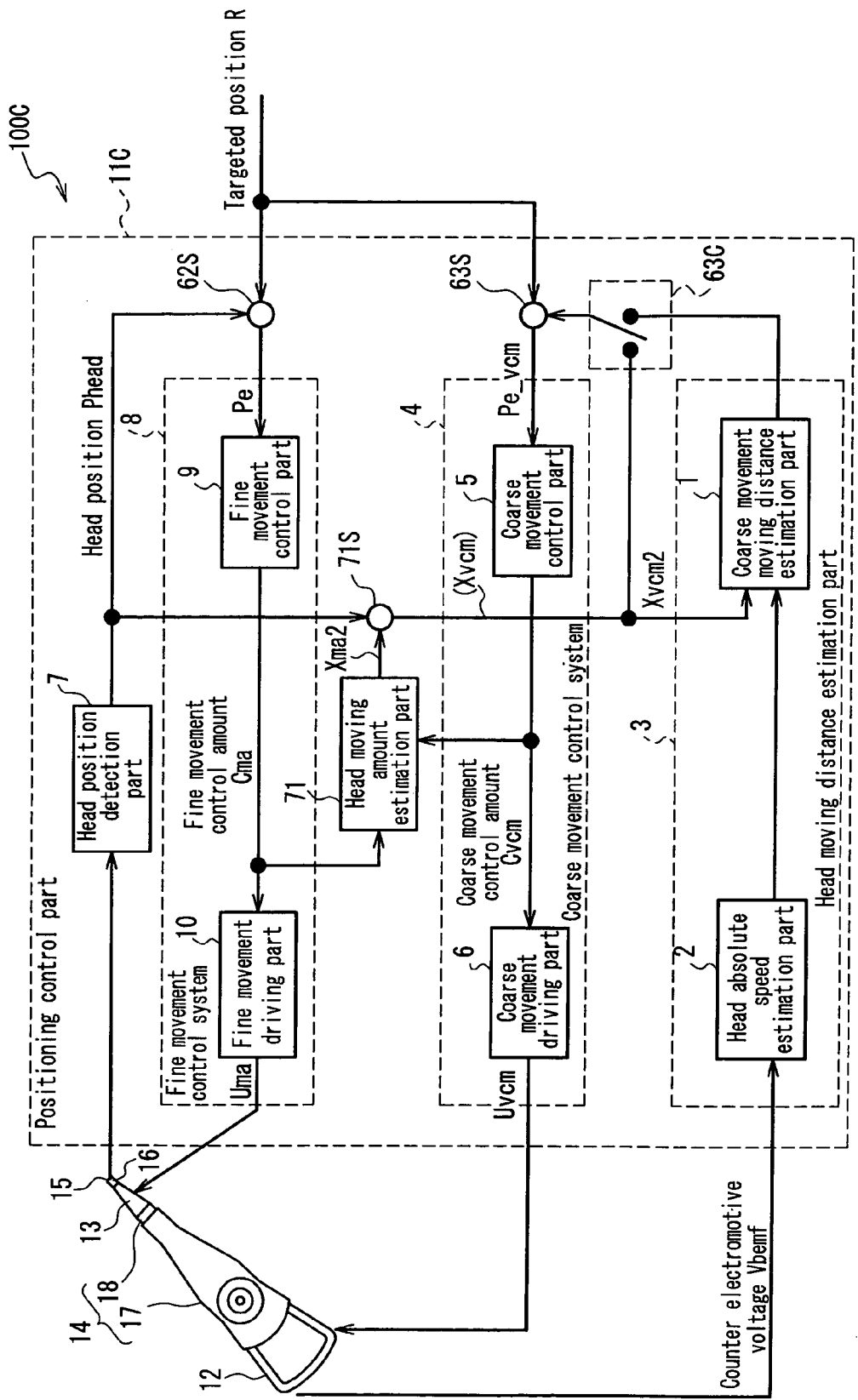
FIG. 13A is a schematic view showing a configuration of a head positioning apparatus according to Embodiment 4.
Figure 13B:
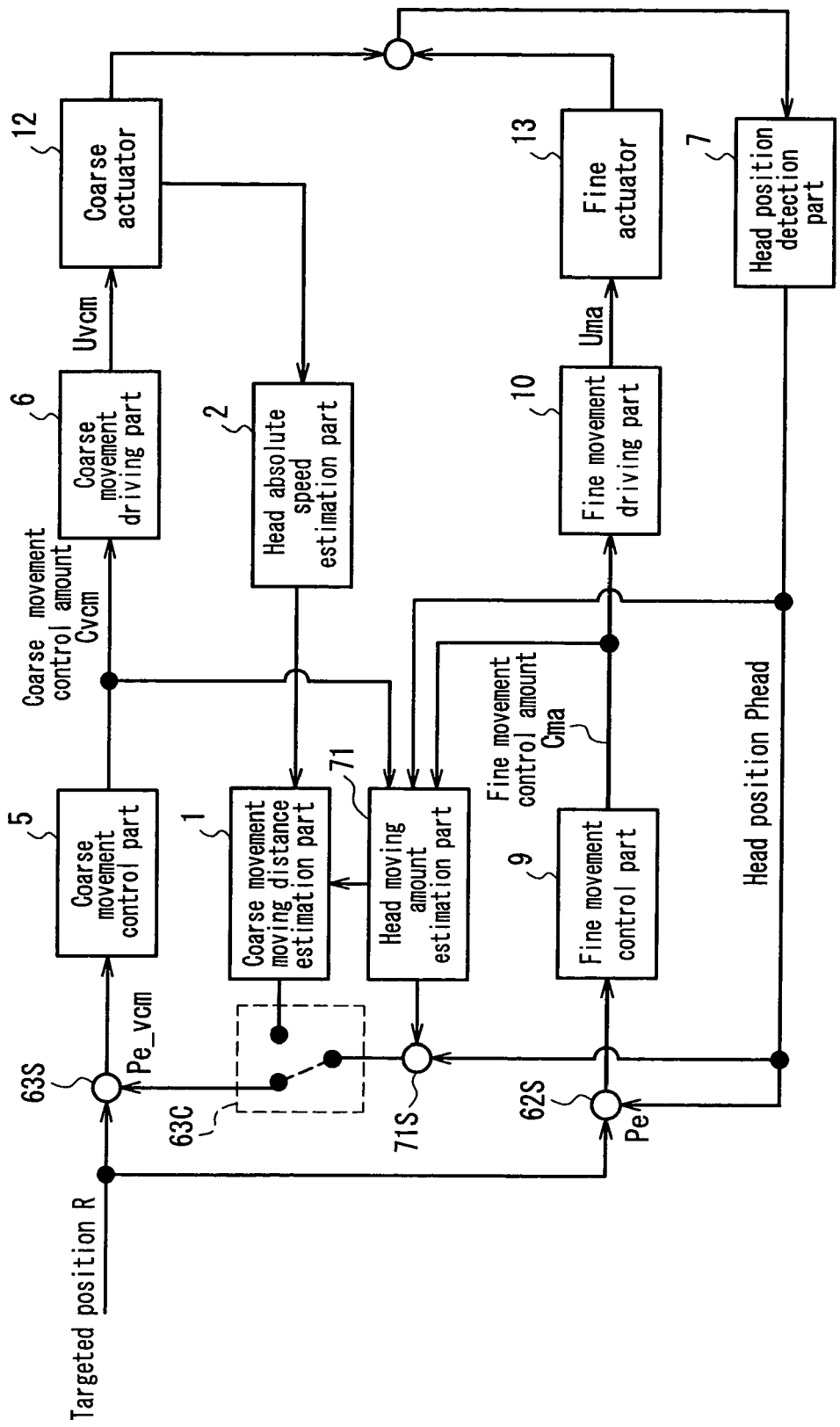
FIG. 13B is a control block diagram of the head positioning apparatus according to Embodiment 4.
Figure 13C:
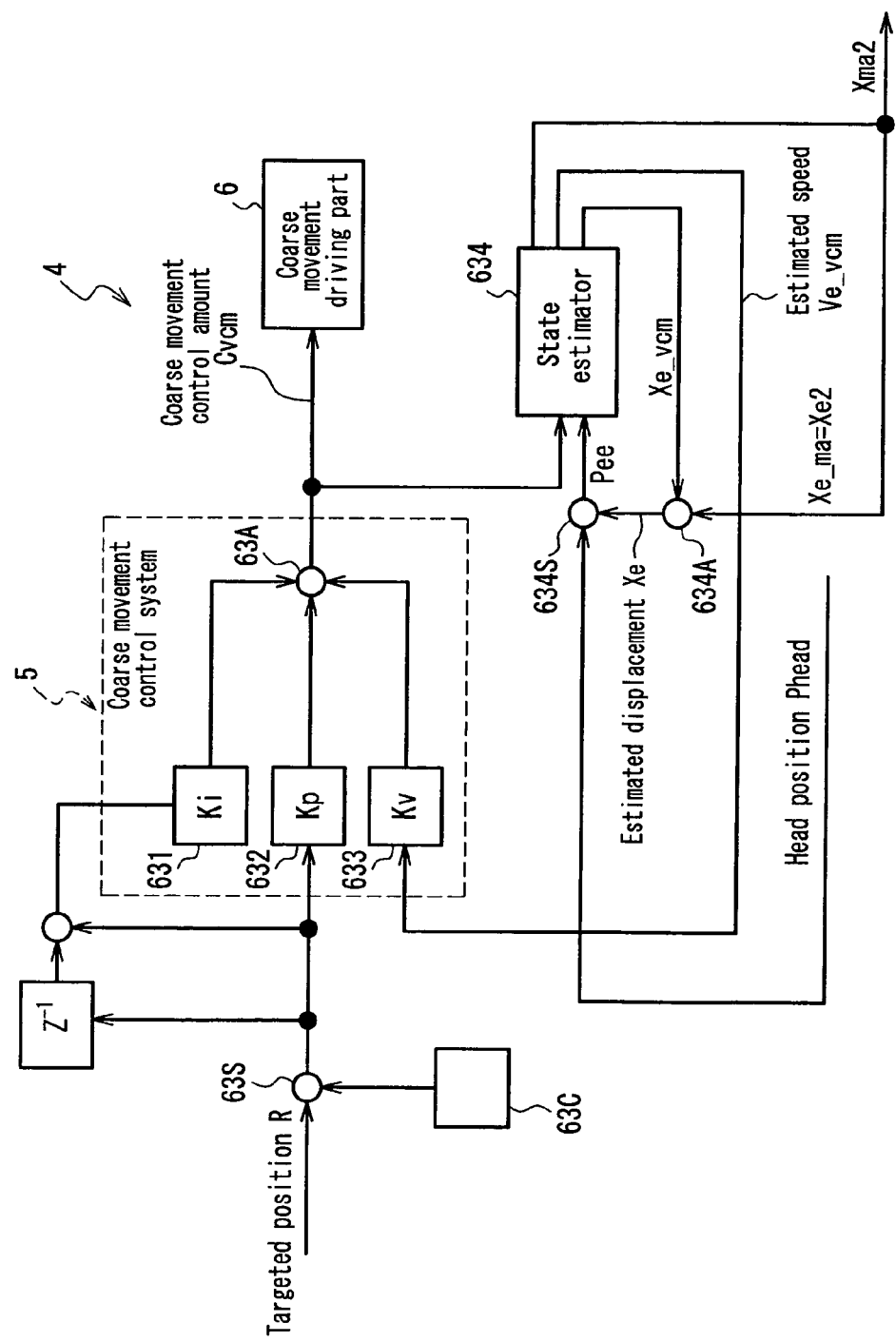
FIG. 13C is a block diagram to explain a configuration of a coarse movement control system provided on the head positioning apparatus according to Embodiment 4.

FIG. 13A is a schematic view showing a configuration of a head positioning apparatus 100C according to Embodiment 4. FIG. 13B is a control block diagram of the head positioning apparatus 100C according to Embodiment 4. FIG. 13C is a block diagram to explain a configuration of a coarse movement control system provided on the head positioning apparatus 100C according to Embodiment 4. The same reference numbers are given to the same constituent elements as those of the head positioning apparatus 100B mentioned in Embodiment 3 with reference to FIGS. 11 and 12 and therefore detailed explanations for these constituent elements are omitted herein.

The difference between the head positioning apparatus 100C and the head positioning apparatus 100B mentioned above is in that the head positioning apparatus 100C includes a head moving distance estimation part 71 and a subtractor 71S instead of the moving distance estimation part 70 and a subtractor 70S.

The head moving distance estimation part 71 estimates the head moving distance Xma2 representing the moving distance the magnetic head 15 is moved by the fine actuator 13 and coarse actuator 12 based on the fine movement control signal Cma generated by a fine movement control part 9 and the coarse movement control signal Cvcm generated by a coarse movement control part 5.

The subtractor 71S supplies a head moving distance Xvcm 2 by the fine actuator 13 and the coarse actuator 12, which are obtained by subtracting the head moving distance Xma2 estimated by the head moving distance estimation part 71 from the head position Phead detected by the head position detection part 7, to the coarse movement distance estimation part 1 and the selector 63C.

The coarse movement moving distance estimation part 1 estimates the head moving distance based on the absolute speed Vvcm of the magnetic head 15 generated by the head absolute speed estimation part 2 by using the head moving distance Xvcm2 supplied from the subsractor 71S as an initial value and supplies the estimated distance to the selector 63C.

The selector 63C selects the head moving distance Xvcm2 supplied from the subtractor 71S and supplies it to the subtractor 63S when the fine movement head moving distance Xma2 estimated by the fine movement moving distance estimation part 71 is 10% or more. The selector 63C selects the head moving distance estimated by the coarse movement distance estimation part 1 and supplies it to the subtractor 63S when the fine movement head moving distance Xma2 is less than 10%.

Thus, the fine actuator 13 is control-driven so that the magnetic head 15 is positioned on the targeted track on the magnetic disk based on the head position Phead. At the same time, when the displacement amount of the fine actuator 13 is smaller than the threshold value, the fine actuator 12 is control-driven so that the magnetic head 15 is positioned (rested) in the vicinity of the targeted track on the magnetic disk independently from the head position Phead.

As mentioned above, according to Embodiment 4, the moving distance of the magnetic head 15 by the coarse actuator 12 is estimated based on the estimated speed by the VCM Back EMF voltage signal Vbemf and the coarse movement control system 4 is configured by the estimated moving distance. At the same time, the fine movement control system 8 is configured based on the head position error by the head position signal Phead. Thereby, cooperative control can be carried out in a high frequency zone with the mutual interference between the operations of the two actuators reduced. Therefore, it is possible to allow the magnetic head to follow a track while suppressing the position error due to friction, FPC reaction force and vibration and to carry out head positioning control at high speed and with high accuracy.

As a result, it is possible to provide a head positioning control apparatus having an excellent effect capable of positioning servo control by a stable operation while reducing the mutual interference of the dual-stage actuator without the head positioning operation being affected by vibration or static friction.

EMBODIMENT 5

Figure 14:
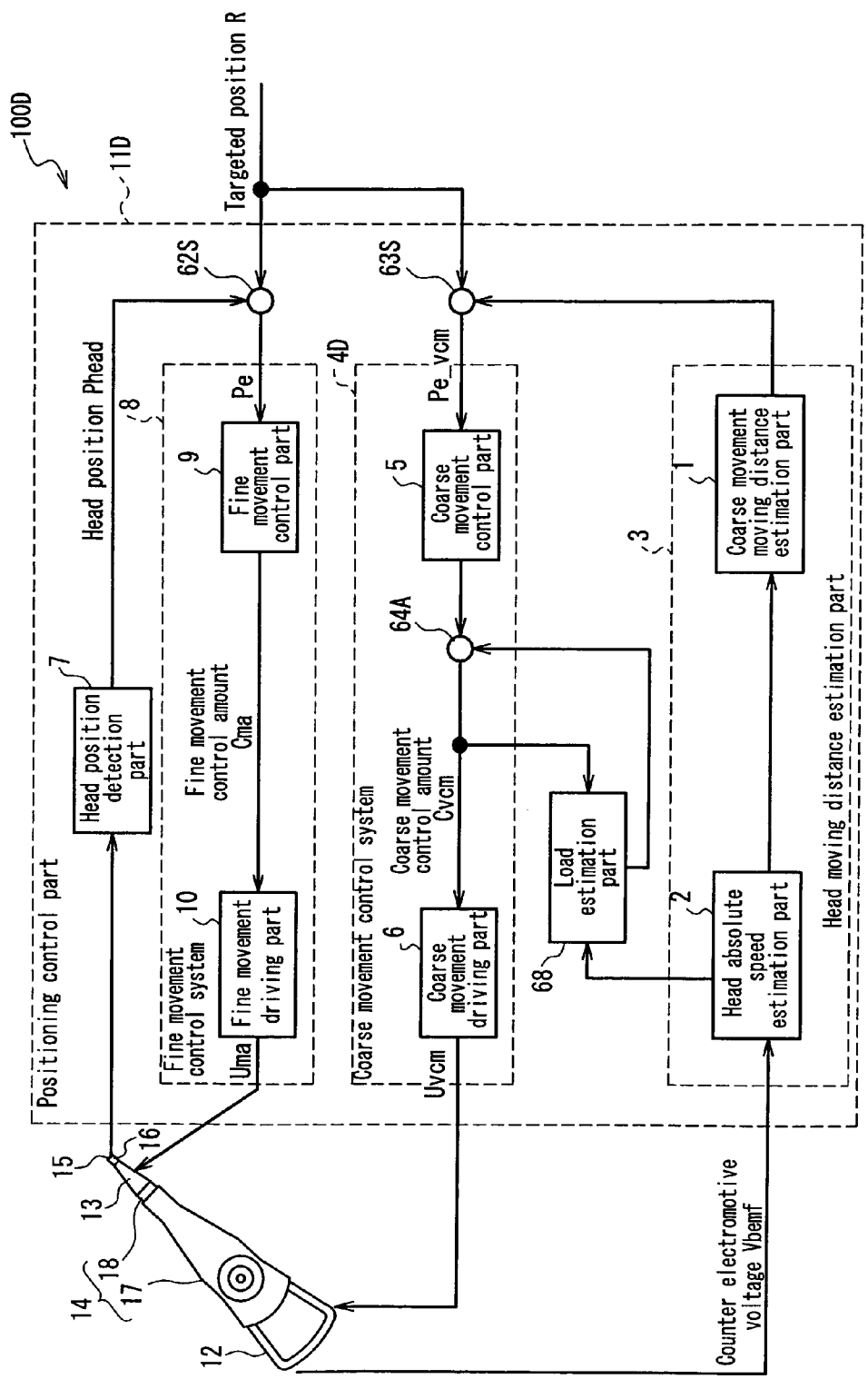
FIG. 14 is a schematic view showing a configuration of a head positioning apparatus according to Embodiment 5.

FIG. 14 is a schematic view showing a configuration of a head positioning apparatus 100D according to Embodiment 5. The same reference numbers are given to the same constituent elements as those of the head positioning apparatus 100 mentioned in Embodiment 1 with reference to FIG. 1 and therefore detailed explanations for these constituent elements are omitted herein. The difference between the head positioning apparatus 100D and the head positioning apparatus 100 mentioned above is in that the head positioning apparatus 100D further includes a load estimation part 68 and coarse movement control system 4D is provided instead of the coarse movement control system 4.

Figure 15:
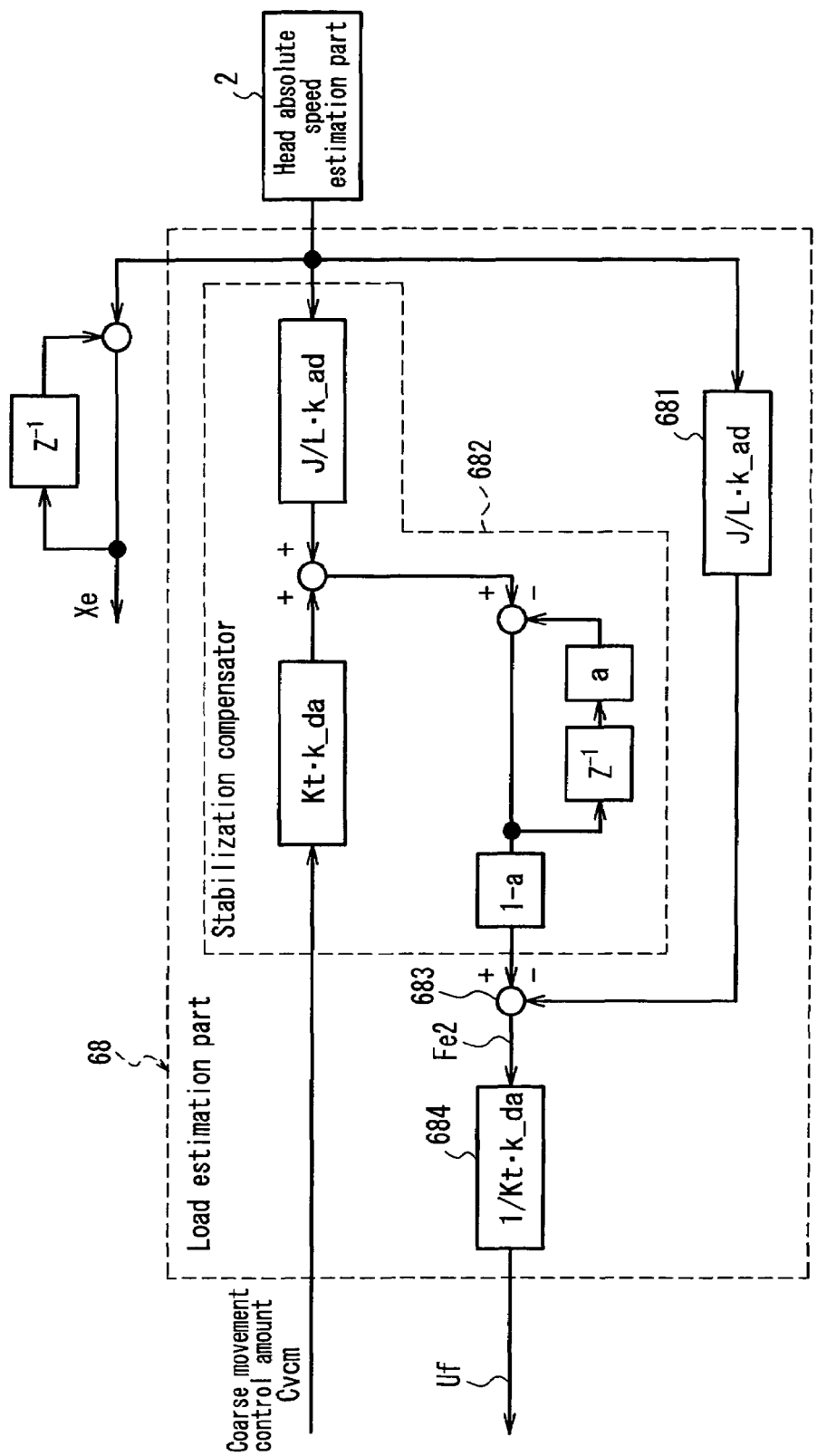
FIG. 15 is a block diagram showing a configuration of a load estimation part provided in the head positioning apparatus according to Embodiment 5.

FIG. 15 is a block diagram showing a configuration of the load estimation portion 68. The load estimation portion 68 generates a disturbance compensation signal Uf for estimating the disturbance force that acts on a head support mechanism 14 of the head positioning apparatus 110D based on the absolute speed Vvcm of the magnetic head 15 estimated by a head absolute speed estimation part 2 and the coarse movement control signal Cvcm generated by the coarse movement control part 5.

The load estimation part 68 is provided with an actuator model 681. The actuator model 681 carries out a modeling of a transfer function relating the transfer of the magnetic head 15 by the coarse actuator 12 by the same transfer model by an electric circuit, and generates an acceleration estimation signal for estimating the acceleration of the magnetic head 15 by the coarse actuator 12 based on the absolute speed Vvcm of the magnetic head 15, which is estimated by the head absolute speed estimation part 2, and supplies the signal to a comparator 683.

The load estimation part 68 has a stabilization compensator 682. The stabilization compensator 682 calculates an acceleration signal based on the absolute speed Vvcm of the magnetic head 15, which is estimated by the head absolute speed estimation part 2, and the coarse movement amount Cvcm generated by the coarse movement control part 5, and supplies the signal to the comparator 683.

The comparator 683 compares the acceleration estimation signal supplied from the actuator model 681 with the acceleration signal supplied from the stabilization compensator 682, and supplies the difference to a disturbance control part 684 as a load estimation signal Fe2. The disturbance control part 684 outputs a disturbance compensation signal Uf obtained by converting the load estimation signal Fe2 supplied from the comparator 683 into the dimension of the control signal to an adder 64A provided in the coarse movement control system 4D.

The adder 64A adds the disturbance compensation signal Uf generated by the load estimation part 68 to the coarse movement control signal Cvcm generated by the coarse movement control part 5 and supplies it to the coarse movement driving part 6 and the load estimation part 68.

Thus, it is possible to compensate off-track with large displacement, which is generated by the disturbance that is a force such as external vibration added to the coarse actuator 12 by the disturbance compensation signal Uf supplied from the coarse movement control system 4D.

As mentioned above, according to Embodiment 5, the fine actuator 13 is control driven so that the magnetic head 15 is positioned on the targeted track on the magnetic disk based on the head position Phead of the magnetic head 15, and the coarse actuator 12 is control driven so that the magnetic head 15 is positioned (rested) in the vicinity of the targeted track on the magnetic disk independently from the head position Phead of the magnetic head 15 by a feed-forward compensation for estimating the disturbance of the force from the outside.

EMBODIMENT 6

Figure 16:
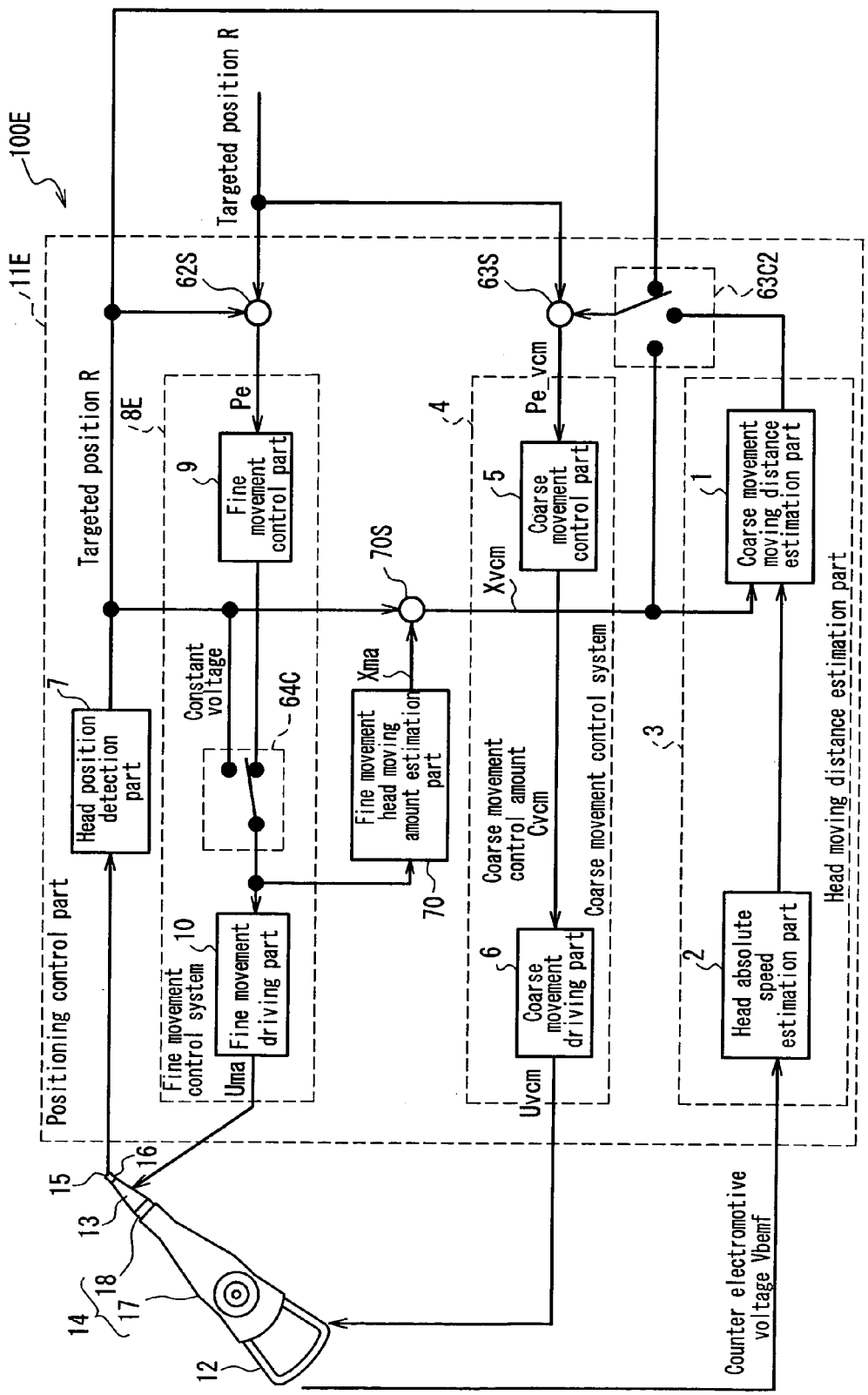
FIG. 16 is a schematic view showing a configuration of a head positioning apparatus according to Embodiment 6.

FIG. 16 is a schematic view showing a configuration of a head positioning apparatus 100E according to Embodiment 6. The same reference numbers are given to the same constituent elements as those of the head positioning apparatus 100B mentioned in Embodiment 3 with reference to FIG. 11 and therefore detailed explanations for these constituent elements are omitted herein. The difference between the head positioning apparatus 100B and the head positioning apparatus 100 mentioned above is in that the head positioning apparatus 100B includes a selector 63C2 instead of the selector 63C and the positioning control system 8E includes a selector 64C.

The selector 63C2 selects the head position Phead detected by the head position detection part 7 and supplies it to the subtractor 63S when the magnitude of the position error signal Pe generated by the subtractor 62S is one track or more.

When the magnitude of the position error signal Pe generated by the subtractor 62S is less than one track, the selector 63C2 selects the head moving distance Xvcm supplied from the subtractor 70S and supplies it to the subtractor 63S when the fine movement head moving distance Xma estimated by the fine movement moving distance estimation part 70 is 10% or more with respect to the track pitch. The selector 63C selects the head moving distance estimated by the coarse movement estimation part 1 and supplies it to the subtractor 63S when the fine movement head moving distance Xma is less than 10% with respect to the track pitch.

When the magnitude of the position error signal Pe is one track or more, a selector 64C selects zero or a certain voltage value that is a predetermined threshold value or less and supplies it to a fine movement driving part 10 and a fine movement head moving distance estimation part 70. When the magnitude of the position error signal Pe is less than one track, a selector 64C selects the fine movement control signal Cma generated by the fine movement control signal 9 and supplies it to the fine movement driving part 10 and the fine movement head moving distance estimation part 70.

The fine actuator 13 includes a thin film PZT element. The predetermined threshold value herein denotes a decomposition voltage of lead or water, or a voltage value in which the electric resistance value of the thin film PZT element is not changed.

As mentioned above, according to Embodiment 6, the fine actuator 13 is control-driven so that the magnetic head 15 is positioned on the targeted track on the magnetic disk based on the head position Phead of the magnetic head 15. When the displacement amount of the fine actuator 13 is the threshold value or smaller, the coarse actuator 12 is control-driven so that the magnetic head 15 is positioned (rested) in the vicinity of the targeted track on the magnetic disk independently from the head position Phead of the magnetic head 15.

EMBODIMENT 7

Figure 17:
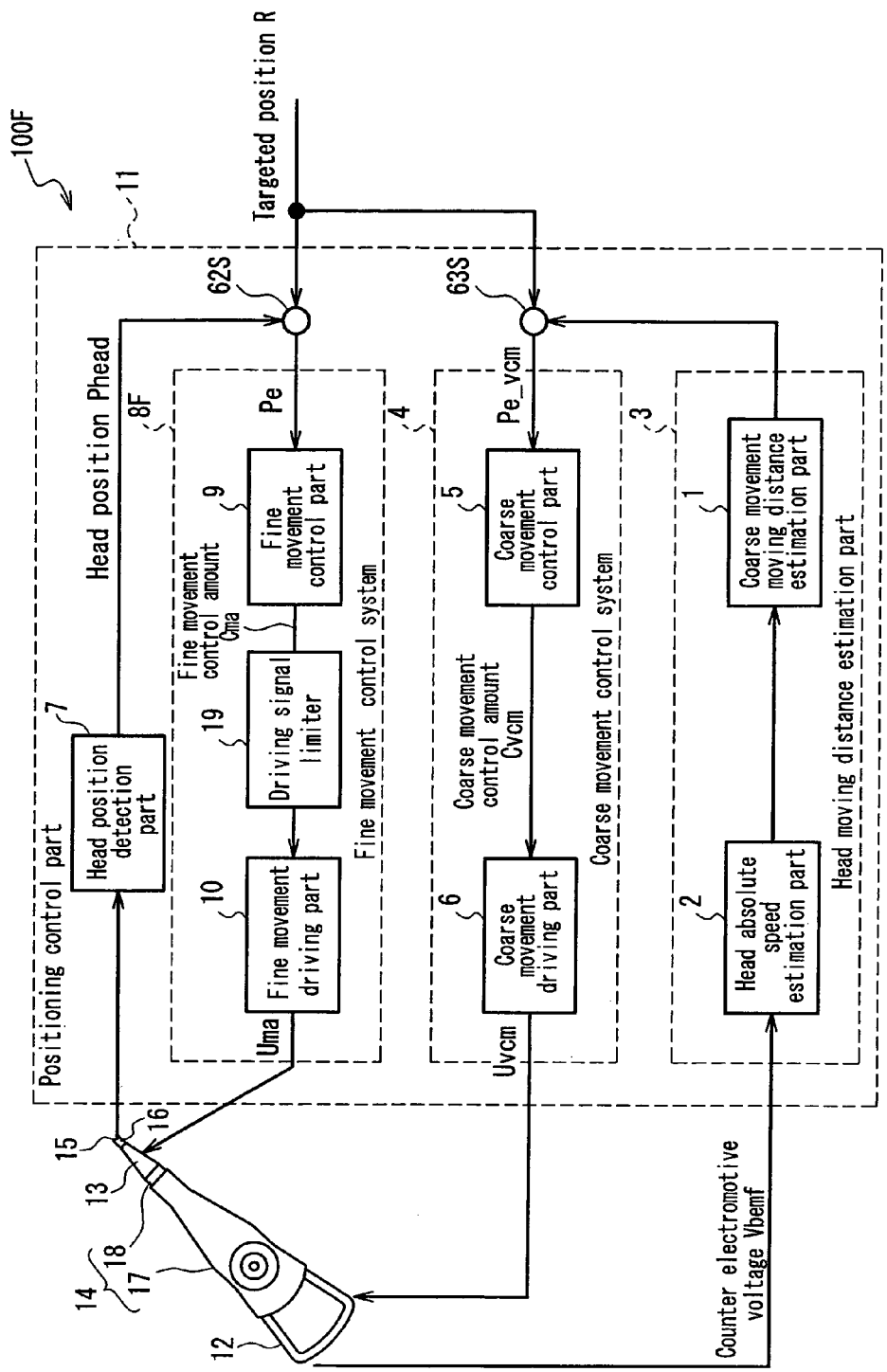
FIG. 17 is a schematic view showing a configuration of a head positioning apparatus according to Embodiment 7.

FIG. 17 is a schematic view showing a configuration of a head positioning apparatus 100F according to Embodiment 7. The same reference numbers are given to the same constituent elements as those of the head positioning apparatus 100 mentioned in Embodiment 1 with reference to FIG. 1. Therefore, detailed explanations for these constituent elements are omitted herein. The difference between the head positioning apparatus 100F in this Embodiment and the head positioning apparatus 100 mentioned above is in that the head positioning apparatus 100F of this Embodiment includes a fine movement control system 8F instead of the fine movement control system 8 and the fine movement control system 8F includes a driving signal limiter 19.

The driving signal limiter 19 supplies a signal, for limiting the level of the driving signal Uma supplied by the fine movement driving portion 10 for driving the fine actuator 13 to not more than the threshold value in which the properties of the piezoelectric element constituting the fine actuator 13 are changed, to the fine movement driving part 10 based on the fine movement control signal Cma from the fine movement control part 9.

The absolute value of the threshold value is larger than the absolute value of the decomposition voltage of lead. Preferably, the absolute value of the threshold value is larger than the absolute value of the decomposition voltage of water, and the voltage V (volt) of the driving signal Uma and electric current I (ampere) flowing in a piezoelectric element satisfies the following relationship:

$$(I/V) < 10^{-6}.$$

More preferably, the absolute value of this threshold value is larger than the absolute value of the decomposition voltage of water, and the voltage V (volt) of a driving signal Uma and the film thickness t (meter) of the piezoelectric element satisfies the following relationship:

$$(V/t) < 2 \times 10^7.$$

Further preferably, the absolute value of this threshold value is larger than the absolute value of the decomposition voltage of water, and the driving signal Uma has a voltage in which the electric resistance of the piezoelectric element is less than 1 MΩ.

Further preferably, this threshold value is set under conditions in which the electric resistance of the piezoelectric element is 1 MΩ or more even if driving is carried out at the temperature of 85° C. and humidity of 90% for 500 hours continuously.

Yet further preferably, when the compensation amount of the piezoelectric element is zero, the fine movement control system 8F outputs a certain value of off-set voltage when the voltage applied to the piezoelectric element is zero or a not more than half of the threshold voltage, and when the compensation amount of the piezoelectric element is not zero, the fine movement control system 8F is control-driven by adding positive/negative voltage in accordance with the value of the compensation amount to the offset voltage.

Figure 18:
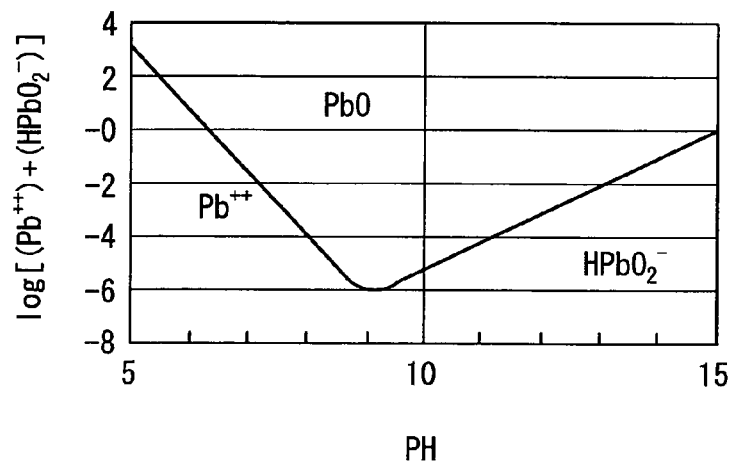
FIG. 18 is a graph to explain an electrochemical reaction of lead oxide in a piezoelectric element in the head positioning apparatus according to Embodiment 7.

FIG. 18 is a graph to explain an electrochemical reaction of lead oxide inside the piezoelectric element of the head positioning apparatus according to Embodiment 7. With reference FIG. 18, corrosion due to the electrochemical reaction of the piezoelectric element will be explained taking the case where the piezoelectric element is a PZT element as an example. The PZT element is one of the typical ceramic piezoelectric materials and the chemical symbol thereof is expressed by the following Formula 1:

$$Pb(Zr, Ti)O_3 \quad \text{(Formula 1)}$$

This PZT element is produced generally by sintering through the powder production and firing process. Furthermore, a thin film PZT element is formed by a sol-gel process or a CVD process (chemical vapor growth method), sputtering, and the like.

An example of the PZT thin film includes a film expressed by the Formula 2:

$$\{Pb(Zr_{0.53}Ti_{0.47})O_3\}_{0.8} + (PbO)_{0.2} \quad \text{(Formula 2)}$$

This is an element in which the ratio of Zr:Tr is 53:47 and PbO is contained in an excess of 20%. This lead oxide (PbO) causes an electrochemical reaction with water entering the element during the process or water entering the element from the atmosphere during the operation. The electrochemical reaction of lead oxide (PbO) is expressed by the following formulae 3 and 4.

When the hydrogen ion exponent (pH) inside the PZT element satisfies pH>9, $$PbO + H_2O \rightarrow H^+ + HPbO_2^- \quad \text{(Formula 3)}$$

When pH<9 is satisfied, $$PbO + H_2O \rightarrow Pb^{2+} + 2OH^- \quad \text{(Formula 4)}$$

Therefore, as shown in FIG. 18, lead oxide PbO is the most stable around pH=9, and as conditions become acid, lead ions (Pb$^{2+}$) are formed. That is to say, lead oxide (PbO) inside the PZT element is reacted with the water entering the element to form lead ions.

Figure 19:
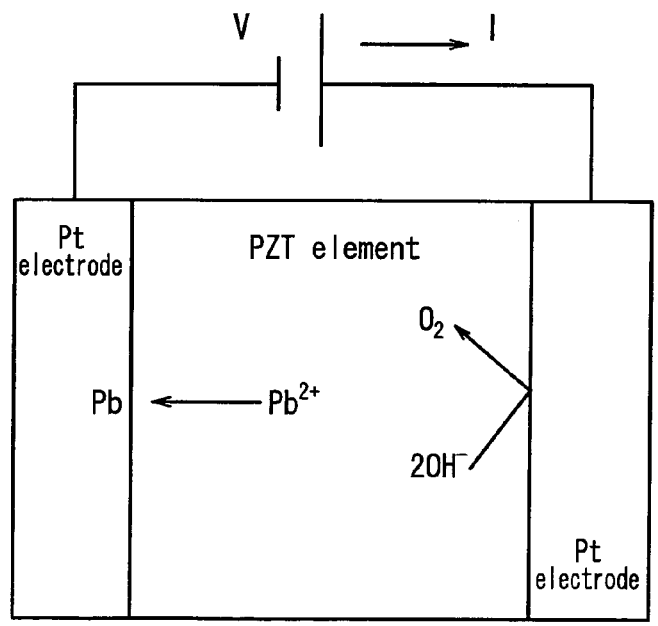
FIG. 19 is a schematic diagram showing an electrochemical reaction of lead oxide in a piezoelectric element in the head positioning apparatus according to Embodiment 7.

FIG. 19 is a schematic view showing an electrochemical reaction inside the piezoelectric element of the head positioning apparatus according to Embodiment 7. As shown in FIG. 19, at both sides of the PZT element, Pt electrodes are disposed and voltage is applied thereto. In this case, the electrochemical reactions including the precipitation of lead at the positive electrode and the negative electrode are expressed by the following formulae 5 and 6, respectively.

Positive electrode side:

$$4OH^- \rightarrow 2H_2O + O_2 + 4e^- \quad \text{(Formula 5)}$$

Negative electrode side:

$$Pb^{2+} + 2e^- \rightarrow Pb \quad \text{(Formula 6)}$$

Formula 5 shows that water and oxide occur from hydroxide ions at the positive electrode, and Formula 6 shows that lead is precipitated at the negative electrode. The both reactions can be expressed by combining the both formulae as follows:

$$2Pb^{2+} + 4OH^- \rightarrow 2Pb + 2H_2O + O_2 \quad \text{(Formula 7)}$$

That is to say, by applying voltage to the PZT element so as to drive the fine actuator 13, lead is precipitated at the electrode. Then, finally, the positive and negative electrodes may be short-circuited due to the lead.

In the above explanation, PbO that is contained in excess in the PZT element was explained, however, in the lead Pb component as a constituent element of the PZT element itself, with electrolysis of water due to the application of voltage, lead ions are precipitated.

Electrolysis (electrochemical reaction) of water is expressed as follows.

Positive electrode side:

$$2H_2O \rightarrow O_2 + 4H^+ + 4e^- \quad \text{(Formula 8)}$$

Negative electrode side:

$$2H^+ + 2e^- \rightarrow H_2 \quad \text{(Formula 9)}$$

Oxygen is generated at the side of the positive electrode. To the negative electrode, hydrogen ions are attracted and hydrogen is generated. Herein, in the vicinity of the negative electrode, since inside the PZT element, lead has a higher oxidation potential as compared with hydrogen, the following chemical reaction occurs.

$$Pb + 2H^+ \rightarrow Pb^{2+} + H_2 \quad \text{(Formula 10)}$$

$$Pb^{2+} + 2e^- \rightarrow Pb \quad \text{(Formula 11)}$$

That is to say, lead is ionized by the hydrogen ion generated by way of the electrolysis of water and further lead ions are precipitated at the negative electrode.

However, the electrochemical reaction such as precipitation of lead or an electrolysis have a feature in that the reaction is accelerated rapidly beyond a certain threshold value of voltage.

Figure 20:
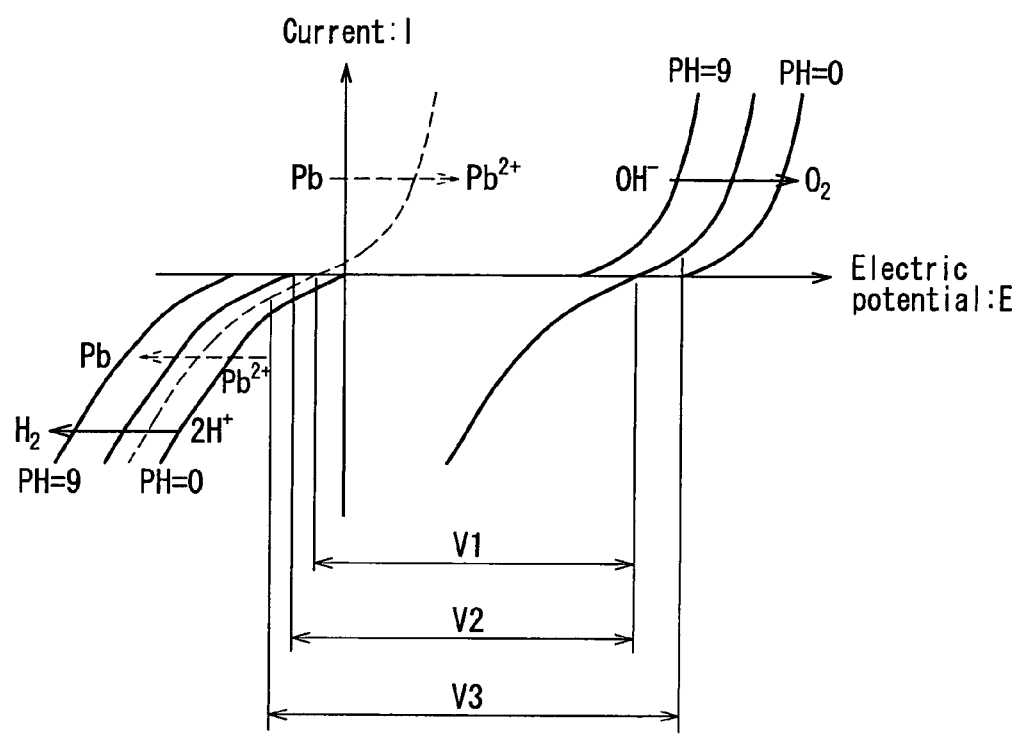
FIG. 20 is a graph showing the relationship between applied voltage (potential difference) and electric current flowing in the piezoelectric element in an electrochemical reaction in which lead is precipitated according to Embodiment 7.

FIG. 20 is a graph showing the relationship between the applied voltage (potential difference) and current flowing in the piezoelectric element in the electrochemical reaction in which lead is precipitated in Embodiment 7. FIG. 20 showing the relationship between the applied voltage (potential difference) and current flowing in the piezoelectric element in the electrochemical reaction shows that the reaction proceeds when the potential difference V1 is 1 or more and current flowing in the element is increased in proportion to the electrolysis decomposition. The potential at which this reaction starts is referred to as the theoretical decomposition voltage. The theoretical decomposition voltage is 0.572 V in the reactions expressed by Formulae 5 and 6 (1.229 V in the reactions expressed by Formulae 8 and 9). The potential difference V1 represents the theoretical decomposition voltage of lead and the potential difference V2 represents the theoretical decomposition voltage of water.

However, in order to generate oxygen by producing the electrolysis, it is necessary to add voltage called oxygen overvoltage to the theoretical voltage. That is to say, by applying the voltage in which oxygen overvoltage is added to the theoretical decomposition voltage, the electrochemical reaction proceeds. This oxygen overvoltage is about 0.37 V to 0.47 V. In other words, when the voltage is applied to the PZT element so as to control drive the fine actuator, the voltage value for causing the reaction expressed by Formula 5 and Formula 6 is:

0.527V+(0.37 V to 0.47 V)≈0.9 V to 1.0 V

On the other hand, the voltage value for causing the reaction expressed by Formula 8 and Formula 9 is:

1.229V+(0.37 V to 0.47 V)≈1.6 V to 1.7 V

That is to say, when the voltage is 1 V or less, the electrochemical reaction in which lead is precipitated hardly proceeds. Furthermore, as to the effect of the atmospheric environment, when the voltage is about 1.7 V or less, the electrochemical reaction, which is accelerated by the electrolysis of water, in which lead is precipitated hardly proceeds.

Actually, for the following reasons, ±10 V or less of arbitrary voltage is applied to the piezoelectric element in accordance with the position error.

In the case of the fine actuator according to Embodiment 7, the electrode to which negative voltage is applied is constantly switched between the positive electrode and the negative electrode depending on the position of the magnetic head, so that lead (Pb) is precipitated in both electrodes. The PZT element is thin such as in the μm order. Therefore, the precipitated lead (Pb) may cause short-circuit. As a result, the piezoelectric element may be destructed. However, as mentioned above, the chemical reaction between lead (Pb) and water is qualitatively the same as the electrolysis of water and both have threshold values voltage at which the decomposition reaction is not generated (accelerated). In other words, in practice, the precipitation amount of lead (Pb) and the threshold value in the range of the chemical reaction speed exist.

Figure 21:
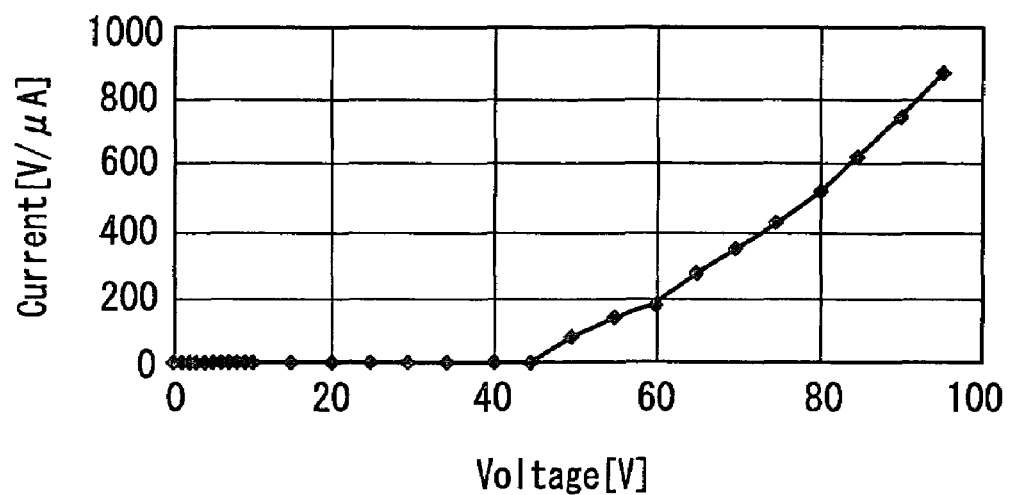
FIG. 21 is a graph showing the relationship between voltage applied to the piezoelectric element and electric current flowing in the piezoelectric element according to Embodiment 7.

FIG. 21 shows a relationship between voltage V [V] and current I [μA] when the voltage is applied to a PZT element of a fine actuator. In the graph, the abscissa shows the applied voltage and the ordinate shows the current flowing in the PZT element. FIG. 21 shows that current flowing in the PZT element is increased rapidly in the vicinity of the applied voltage of 50V. When the applied voltage is in the range from 0V to 50 V, the applied voltage V is proportional to the current flowing in the PZT element in which the factor of proportionality is sufficiently small, and electrical resistance value R=V/I=10×10$^6$ [Ω]=10 [MΩ] is satisfied. In the range in which the applied voltage is higher than 50V, V/I=70×10$^3$ [Ω] is satisfied, showing that the electrical resistance value R becomes significantly small.

Figure 22:
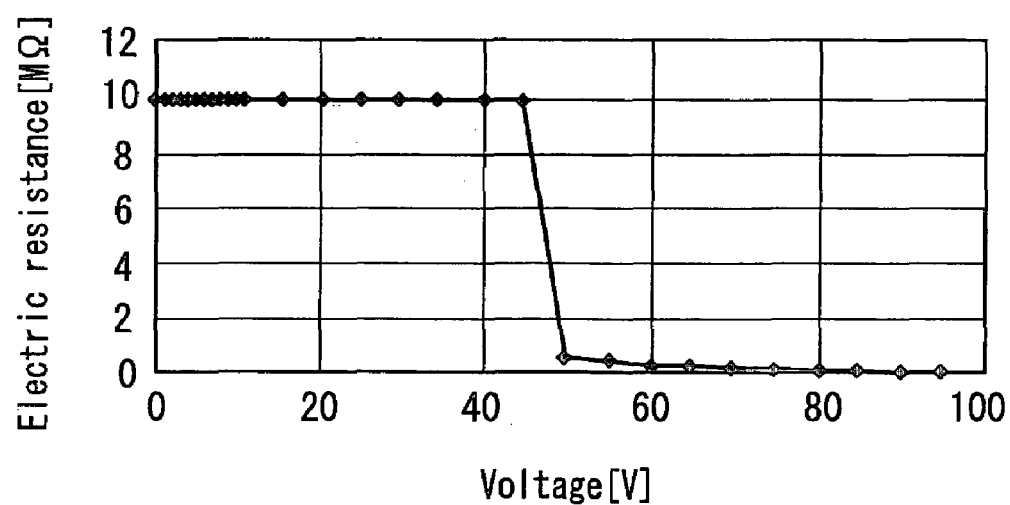
FIG. 22 is a graph showing the relationship between voltage applied to the piezoelectric element and electric resistance value inside according to Embodiment 7.

FIG. 22 shows the relationship between the applied voltage and the electrical resistance value R of the PZT element based on FIG. 21. At the applied voltage of 50V, the electrical resistance is reduced from 10 MΩ to about 70–100 kΩ. When the applied voltage is further increased, the electric resistance value is reduced rapidly. If a fine actuator is used in the region in which the resistance value is too small, the fine actuator may be destructed.

Therefore, by driving the fine actuator of the PZT element in the range of not more than the voltage that is a point in which the electrical resistance rapidly is changed, practically, short-circuit of the PZT element due to an electrochemical change and destruction of the fine actuator can be prevented.

When further investigation is carried out, the point at which the electrical resistance changes is changed due to the quality and the film thickness of the PZT element. The dependency on the quality of the film is a problem in production. The dependency on the film thickness requires driving taking the property thereof into consideration.

Figure 23:
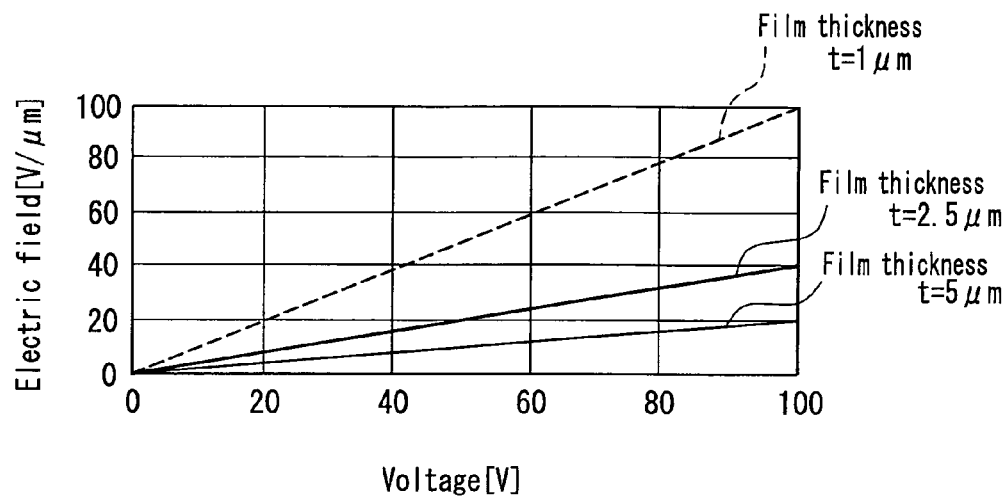
FIG. 23 is a graph showing the relationship between voltage applied to a piezoelectric element and electric field with the film thickness as a parameter according to Embodiment 7.
Figure 24:
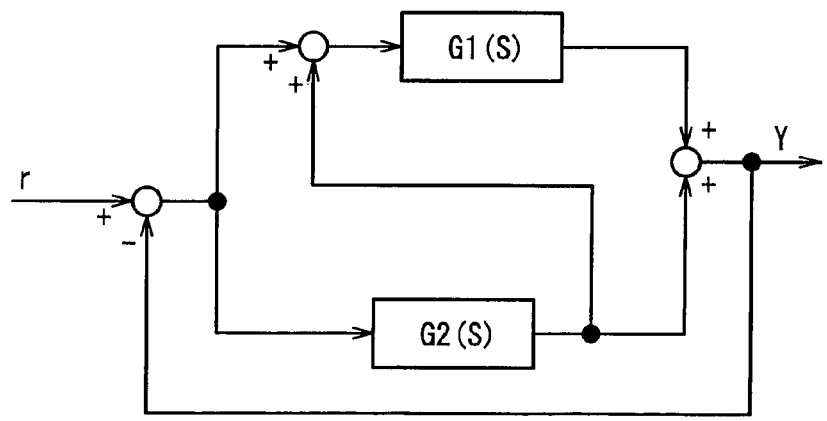
FIG. 24 is a control block diagram showing a conventional head positioning apparatus.
Figure 25:
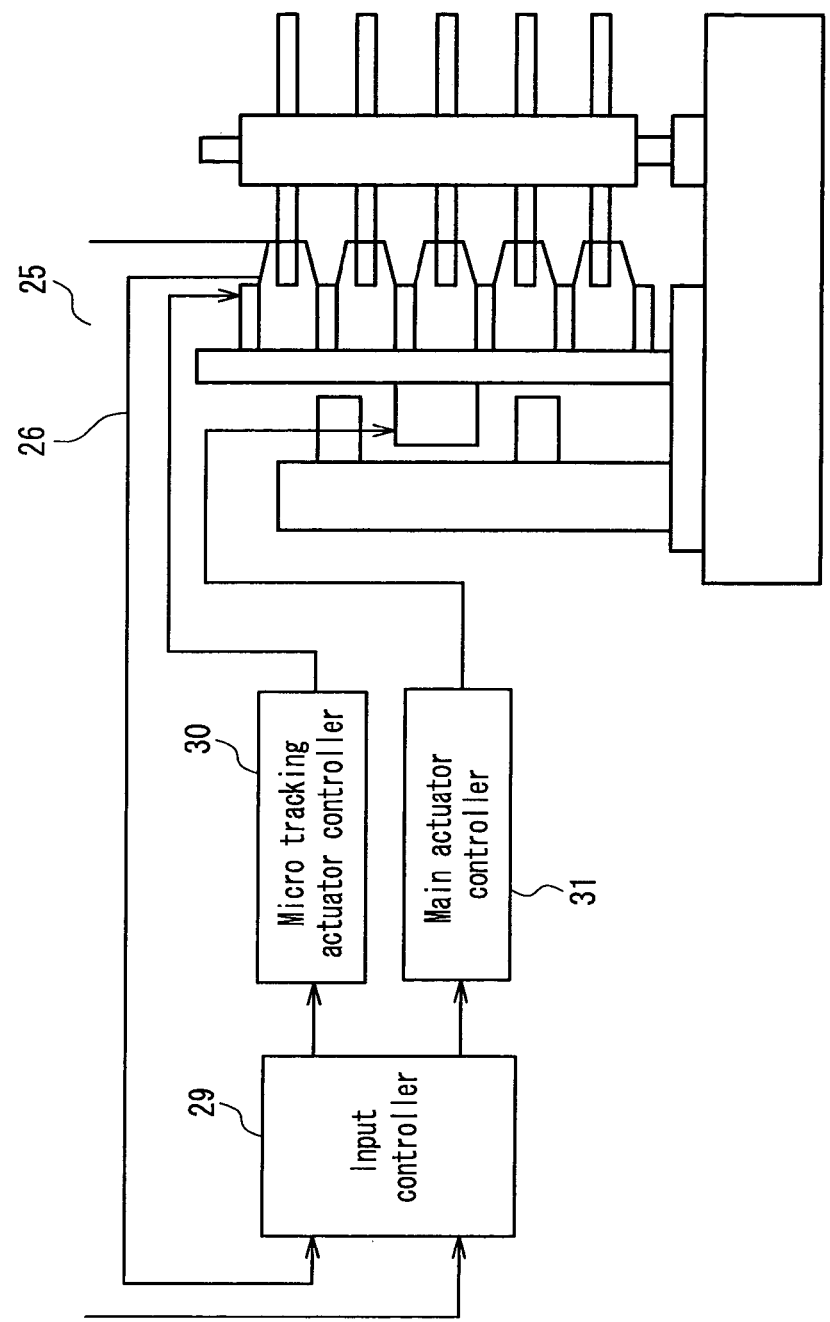
FIG. 25 is a control block diagram showing another conventional head positioning apparatus.

FIG. 23 shows the relationship between the applied voltage V and the electric field applied to the PZT element (E=V/t) when the film thickness t of the PZT element is 1 to 5 μm. Herein, when the film thickness t of the PZT element constituting the fine actuator t is 2.5 μm, the above-mentioned applied voltage of 50 V or less corresponds to the electric field of 20 V/μm or less.

Furthermore, by multiplying the safety factor 0.2 to the permissible applied voltage, the bias voltage is made to be 0V that is the decomposition voltage or less and threshold value of the applied voltage to be ±10V. That is to say, under this conditions, the apparatus can be used while suppressing the current to 1 μA or less, thus reliably avoiding the destruction of the fine actuator and short-circuit of the piezoelectric element.

That is to say, the positioning control is carried out so that the fine actuator 13 allows the error between the present position and the targeted position of the magnetic head 15 to be 0, the fine actuator 12 allows the moving distance of the fine actuator 13 to be 0, and further position error between the targeted position and the head moving distance by the fine actuator 13 to be 0. By this control method, the fine actuator 13 improves the positioning performance by carrying out the control drive in the vicinity of the middle of the operating range with small driving voltage.

In Embodiment 7, the compensation of the disturbance of the synchronous rotation with low frequency with large position error is carried out by the coarse actuator 12 and in the range in which the threshold value voltage, by the driving signal limiter 19, the fine actuator 13 composed of the PZT element is driven to control.

As mentioned above, according to the present invention, it is possible to provide a positioning apparatus capable of positioning a head at high speed and with high accuracy.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A head positioning apparatus, comprising:
   a magnetic head for recording/reproducing information on a rotary recording medium;
   a head support mechanism provided swingably on the recording medium while supporting the magnetic head;
   a coarse actuator for swinging the head support mechanism for coarsely positioning the magnetic head on the recording medium;
   a fine actuator provided in the head support mechanism for precisely positioning the magnetic head on the recording medium;
   a head position detector for detecting the head position representing the position of the magnetic head; and
   a fine movement control system for controlling the fine actuator based on the head position detected by the head position detector,
   the head positioning apparatus further comprising:
      a head moving distance estimator for estimating a head moving distance representing a distance the magnetic head moves based on VCM Back EMF voltage generated in the coarse actuator; and
      a coarse movement control system for controlling the coarse actuator based on the head moving distance estimated by the head moving distance estimator;
   wherein the head moving distance estimator comprises a head absolute speed estimator for estimating a head absolute speed representing the absolute speed of the magnetic head based on the VCM Back EMF voltage; and a coarse movement distance estimator for estimating the head moving distance based on the head absolute speed estimated by the head absolute speed estimator;
   wherein the fine movement control system comprises a fine movement controller for generating the control signal for controlling the fine actuator based on the head position detected by the head position detector; and further comprises a fine movement head moving distance estimator for estimating the fine movement head moving distance representing the amount that the magnetic head is moved by the fine actuator based on the control signal generated by the fine movement controller; and
   wherein the coarse movement moving distance estimator estimates the head moving distance by defining the coarse movement head moving distance representing the amount that the magnetic head is moved by the coarse actuator, which is obtained by subtracting the fine movement head moving distance estimated by the fine movement head moving distance estimator from the head position detected by the head position detector, as an initial value.

2. The head positioning apparatus according to claim 1, wherein the coarse actuator comprises a voice coil motor.

3. The head positioning apparatus according to claim 1, wherein the coarse movement moving distance estimator estimates the head moving distance based on the integration of the head absolute speed.

4. The head positioning apparatus according to claim 1, wherein the coarse movement moving distance estimator estimates the head moving distance based on the integration of the head absolute speed by setting the initial value of the head moving distance to zero.

5. The head positioning apparatus according to claim 1, wherein the coarse movement control system receives any of the coarse movement head moving distance obtained by subtracting the fine movement head moving distance from the head position, the head moving distance estimated by the coarse movement moving distance estimator, and the head position detected by the head position detector, in accordance with the magnitude of the fine movement head moving distance estimated by the head moving distance estimator and the error with respect to a targeted position of the head position detected by the head position detector.

6. A head positioning apparatus, comprising:
   a magnetic head for recording/reproducing information on a rotary recording medium;
   a head support mechanism provided swingably on the recording medium while supporting the magnetic head;
   a coarse actuator for swinging the head support mechanism for coarsely positioning the magnetic head on the recording medium;
   a fine actuator provided in the head support mechanism for precisely positioning the magnetic head on the recording medium;
   a head position detector for detecting the head position representing the position of the magnetic head; and
   a fine movement control system for controlling the fine actuator based on the head position detected by the head position detector,
   the head positioning apparatus further comprising:
      a head moving distance estimator for estimating a head moving distance representing a distance the magnetic head moves based on VCM Back EMF voltage generated in the coarse actuator; and
      a coarse movement control system for controlling the coarse actuator based on the head moving distance estimated by the head moving distance estimator;
   wherein the head moving distance estimator comprises a head absolute speed estimator for estimating a head absolute speed representing the absolute speed of the magnetic head based on the VCM Back EMF voltage; and a coarse movement distance estimator for estimating the head moving distance based on the head absolute speed estimated by the head absolute speed estimator;
   wherein the fine movement control system comprises a fine movement controller for generating a fine control signal for controlling the fine actuator based on the head position detected by the head position detector; the coarse movement control system comprises a coarse movement controller for generating the coarse movement control signal for controlling the coarse actuator based on the head moving distance estimated by the head moving distance detector; and the head position detector further comprises a fine movement head moving distance estimator for estimating a fine movement head moving distance representing the amount that the magnetic head is moved by the fine actuator based on the fine movement control signal generated by the fine movement controller and the coarse movement control signal generated by the coarse movement controller; and
   wherein the coarse movement moving distance estimator estimates the head moving distance by defining the coarse movement head moving distance representing the amount that the magnetic head is moved by the coarse actuator, which is obtained by subtracting the fine movement head moving distance estimated by the fine movement head moving distance estimator from the head position detected by the head position detector, as an initial value.

7. The head positioning apparatus according to claim 6, wherein the coarse movement controller receives any of the coarse movement head moving distance obtained by subtracting the fine movement head moving distance from the head position and the head moving distance estimated by the coarse movement moving distance estimator, in accordance with the magnitude of the fine movement head moving distance estimated by the fine movement head moving distance estimator.

8. The head positioning apparatus according to claim 6, wherein the coarse actuator comprises a voice coil motor.

9. The head positioning apparatus according to claim 6, wherein the coarse movement moving distance estimator estimates the head moving distance based on the integration of the head absolute speed.

10. The head positioning apparatus according to claim 6, wherein the coarse movement moving distance estimator estimates the head moving distance based on the integration of the head absolute speed by setting the initial value of the head moving distance to zero.

11. A head positioning apparatus, comprising:
a magnetic head for recording/reproducing information on a rotary recording medium;
a head support mechanism provided swingably on the recording medium while supporting the magnetic head;
a coarse actuator for swinging the head support mechanism for coarsely positioning the magnetic head on the recording medium;
a fine actuator provided in the head support mechanism for precisely positioning the magnetic head on the recording medium;
a head position detector for detecting the head position representing the position of the magnetic head; and
a fine movement control system for controlling the fine actuator based on the head position detected by the head position detector,
the head positioning apparatus further comprising:
a head moving distance estimator for estimating a head moving distance representing a distance the magnetic head moves based on VCM Back EMF voltage generated in the coarse actuator; and
a coarse movement control system for controlling the coarse actuator based on the head moving distance estimated by the head moving distance estimator;
wherein the fine actuator comprises a piezoelectric element;
the fine movement control system supplies a driving signal for driving the piezoelectric element to the piezoelectric element;
a level of the driving signal is not more than a threshold value at which the property of the piezoelectric element changes; and
the absolute value of the threshold value is larger than the absolute value of the decomposition voltage of lead; and
wherein the absolute value of threshold value is larger than the absolute value of the decomposition voltage of water; and the voltage V (volt) of the driving signal and electric current I (ampere) flowing in the piezoelectric element satisfies the following relationship:

$(I/V)<10^{-6}$.

12. The head positioning apparatus according to claim 11, wherein the fine movement control system comprises a fine movement controller for generating the control signal for controlling the fine actuator based on the head position detected by the head position detector; and the fine movement driving device for generating a driving signal for driving the fine actuator based on the control signal generated by the fine movement controller.

13. The head positioning apparatus according to claim 11, wherein the fine movement control system comprises a fine movement controller for generating the control signal for controlling the fine actuator based on the head position detected by the head position detector; the fine movement driving device for generating a driving signal based on the control signal generated by the fine movement controller; and a driving signal limiter for supplying a signal for limiting the level of the driving signal to be not more than the threshold value to the fine movement driving device based on the control signal from the fine movement controller.

14. The head positioning apparatus according to claim 11, wherein the coarse actuator comprises a voice coil motor.

15. A head positioning apparatus, comprising:
a magnetic head for recording/reproducing information on a rotary recording medium;
a head support mechanism provided swingably on the recording medium while supporting the magnetic head;
a coarse actuator for swinging the head support mechanism for coarsely positioning the magnetic head on the recording medium;
a fine actuator provided in the head support mechanism for precisely positioning the magnetic head on the recording medium;
a head position detector for detecting the head position representing the position of the magnetic head; and
a fine movement control system for controlling the fine actuator based on the head position detected by the head position detector,
the head positioning apparatus further comprising:
a head moving distance estimator for estimating a head moving distance representing a distance the magnetic head moves based on VCM Back EMF voltage generated in the coarse actuator; and
a coarse movement control system for controlling the coarse actuator based on the head moving distance estimated by the head moving distance estimator;
wherein the fine actuator comprises a piezoelectric element;
the fine movement control system supplies a driving signal for driving the piezoelectric element to the piezoelectric element;
a level of the driving signal is not more than a threshold value at which the property of the piezoelectric element changes; and
the absolute value of the threshold value is larger than the absolute value of the decomposition voltage of lead; and
wherein the absolute value of the threshold value is larger than the absolute value of the decomposition voltage of water; and the voltage V (volt) of the driving signal and the film thickness t (meter) of the piezoelectric element satisfies the following relationship:

$(V/t)<2\times10^{7}$.

16. The head positioning apparatus according to claim 15, wherein the coarse actuator comprises a voice coil motor.

17. The head positioning apparatus according to claim 15, wherein the fine movement control system comprises a fine movement controller for generating the control signal for controlling the fine actuator based on the head position detected by the head position detector; and the fine movement driving device for generating a driving signal for driving the fine actuator bused on the control signal generated by the fine movement controller.

18. The head positioning apparatus according to claim 15, wherein the fine movement control system comprises a fine movement controller for generating the control signal for controlling the fine actuator based on the head position detected by the head position detector; the fine movement driving device for generating a driving signal based on the control signal generated by the fine movement controller; and a driving signal limiter for supplying a signal for limiting the level of the driving signal to be not more than the threshold value to the fine movement driving device based on the control signal from the fine movement controller.

19. A head positioning apparatus, comprising:
a magnetic head for recording I reproducing information on a rotary recording medium;
a head support mechanism provided swingably on the recording medium while supporting the magnetic head;
a coarse actuator for swinging the head support mechanism for coarsely positioning the magnetic head on the recording medium;
a fine actuator provided in the head support mechanism for precisely positioning the magnetic head on the recording medium;
a head position detector for detecting the head position representing the position of the magnetic head; and
a fine movement control system for controlling the fine actuator based on the head position detected by the head position detector;
the head positioning apparatus further comprising:
a head moving distance estimator for estimating a head moving distance representing a distance the magnetic head moves based on VCM Back EMF voltage generated in the coarse actuator; and
a coarse movement control system for controlling the coarse actuator based on the head moving distance estimated by the head moving distance estimator;
wherein the fine actuator comprises a piezoelectric element;
the fine movement control system supplies a driving signal for driving the piezoelectric element to the piezoelectric element;
a level of the driving signal is not more than a threshold value at which the property of the piezoelectric element changes; and
the absolute value of the threshold value is larger than the absolute value of the decomposition voltage of lead; and
wherein the absolute value of the threshold value is larger than the absolute value of the decomposition voltage of water; and the driving signal has a voltage in which the electric resistance of the piezoelectric element is less than 1 MΩ.

20. The head positioning apparatus according to claim 19, wherein the coarse actuator comprises a voice coil motor.

21. The head positioning apparatus according to claim 19, wherein the fine movement control system comprises a fine movement controller for generating the control signal for controlling the fine actuator based on the head position detected by the head position detector; and the fine movement driving device for generating a driving signal for driving the fine actuator based on the control signal generated by the fine movement controller.

22. The head positioning apparatus according to claim 19, wherein the fine movement control system comprises a fine movement controller for generating the control signal for controlling the fine actuator based on the head position detected by the head position detector; the fine movement driving device for generating a driving signal based on the control signal generated by the fine movement controller; and a driving signal limiter for supplying a signal for limiting the level of the driving signal to be not more than the threshold value to the fine movement driving device based on the control signal from the fine movement controller.

23. A head positioning apparatus, comprising:
a magnetic head for recording/reproducing information an a rotary recording medium;
a head support mechanism provided swingably on the recording medium while supporting the magnetic head;
a coarse actuator for swinging the head support mechanism for coarsely positioning the magnetic head on the recording medium;
a fine actuator provided in the head support mechanism for precisely positioning the magnetic head on the recording medium;
a head position detector for detecting the head position representing the position of the magnetic head; and
a fine movement control system for controlling the fine actuator based on the head position detected by the head position detector;
the head positioning apparatus further comprising:
a head moving distance estimator for estimating a head moving distance representing a distance the magnetic head moves based on VCM Back EMF voltage generated in the coarse actuator; and
a coarse movement control system for controlling the coarse actuator based on the head moving distance estimated by the head moving distance estimator;
wherein the fine actuator comprises a piezoelectric element;
the fine movement control system supplies a driving signal for driving the piezoelectric element to the piezoelectric element;
a level of the driving signal is not more than a threshold value at which the property of the piezoelectric element changes; and
the absolute value of the threshold value is larger than the absolute value of the decomposition voltage of lead; and
the threshold value is set under the conditions in which the electric resistance value of the piezoelectric element is 1 MΩ or more even if driving is carried out at the temperature of 85° C. and the humidity of 90% for 500 hours continuously.

24. The head positioning apparatus according to claim 23, wherein the coarse actuator comprises a voice coil motor.

25. The head positioning apparatus according to claim 23, wherein the fine movement control system comprises a fine movement controller for generating the control signal for controlling the fine actuator based on the head position detected by the head position detector; and the fine movement driving device for generating a driving signal for driving the fine actuator based on the control signal generated by the fine movement controller.

26. The head positioning apparatus according to claim 23, wherein the fine movement control system comprises a fine movement controller for generating the control signal for controlling the fine actuator based on the head position detected by the head position detector; the fine movement driving device for generating a driving signal based on the control signal generated by the fine movement controller; and a driving signal limiter for supplying a signal for limiting the level of the driving signal to be not more than the threshold value to the fine movement driving device based on the control signal from the fine movement controller.

27. A head positioning apparatus, comprising:
a magnetic head for recording/reproducing information on a rotary recording medium;
a head support mechanism provided swingably on the recording medium while supporting the magnetic head;
a coarse actuator for swinging the head support mechanism for coarsely positioning the magnetic head on the recording medium;
a fine actuator provided in the head support mechanism for precisely positioning the magnetic head on the recording medium;
a head position detector for detecting the head position representing the position of the magnetic head; and
a fine movement control system for controlling the fine actuator based on the head position detected by the head position detector;
the head positioning apparatus further comprising:
a head moving distance estimator for estimating a head moving distance representing a distance the magnetic head moves based on VCM Back EMF voltage generated in the coarse actuator; and
a coarse movement control system for controlling the coarse actuator based on the head moving distance estimated by the head moving distance estimator;
wherein the fine actuator comprises a piezoelectric element;
the fine movement control system supplies a driving signal for driving the piezoelectric element to the piezoelectric element;
a level of the driving signal is not more than a threshold value at which the property of the piezoelectric element changes; and
the absolute value of the threshold value is larger than the absolute value of the decomposition voltage of lead; and
wherein in the case where the compensation amount of the piezoelectric element is zero, the fine movement control system outputs a constant value of offset voltage when the voltage applied to the piezoelectric element is zero or not more than a half of the threshold voltage; and in the case where the compensation amount of the piezoelectric element is not zero, the fine movement control system is control-driven by adding positive/negative voltage in accordance with the value of the compensation amount to the offset voltage.

28. The head positioning apparatus according to claim 27, wherein the coarse actuator comprises a voice coil motor.

29. A head positioning apparatus, comprising:
a magnetic head for recording/reproducing information on a rotary recording medium;
a head support mechanism provided swingably on the recording medium while supporting the magnetic head;
a coarse actuator for swinging the head support mechanism for coarsely positioning the magnetic head on the recording medium;
a fine actuator provided in the head support mechanism for precisely positioning the magnetic head on the recording medium;
a head position detector for detecting the head position representing the position of the magnetic head; and
a fine movement control system for controlling the fine actuator based on the head position detected by the head position detector;
the head positioning apparatus further comprising:
a head moving distance estimator for estimating a head moving distance representing a distance the magnetic head moves based on VCM Back EMF voltage generated in the coarse actuator; and
a coarse movement control system for controlling the coarse actuator based on the head moving distance estimated by the head moving distance estimator;
wherein the head moving distance estimator comprises a head absolute speed estimator for estimating the head absolute speed representing the absolute speed of the magnetic head based on the VCM Back EMF voltage generated in the coarse actuator;
the coarse movement control system comprises a coarse movement controller for generating the coarse movement control signal for controlling the coarse actuator based on the head moving distance estimated by the moving distance estimator; and
the head positioning apparatus further comprises a load estimator for generating the disturbance compensation signal for estimating the disturbance acting on the head positioning apparatus based on the head absolute speed estimated by the head absolute speed estimator and the coarse movement control signal generated by the coarse movement controller.

30. The head positioning apparatus according to claim 29, wherein the coarse actuator comprises a voice coil motor.

* * * * *

UNITED STATES PATENT AND TRADEMARK OFFICE
CERTIFICATE OF CORRECTION

PATENT NO. : 7,038,877 B2
APPLICATION NO. : 10/800193
DATED : May 2, 2006
INVENTOR(S) : Kohso et al.

Page 1 of 1

It is certified that error appears in the above-identified patent and that said Letters Patent is hereby corrected as shown below:

Title Page, Item (73) assignee: "Idustrial" should read --Industrial--
Column 25, line 1(claim 17): "bused" should read --based--
Column 25, line 16(claim19): "recording I reproducing" should read --recording/reproducing--
Column 26, line 11(claim23): "information an" should read --information on--

Signed and Sealed this

Thirteenth Day of February, 2007

JON W. DUDAS
*Director of the United States Patent and Trademark Office*